United States Patent
Petelka

(10) Patent No.: US 11,745,569 B2
(45) Date of Patent: Sep. 5, 2023

(54) AUTO LOCKING MECHANISM

(71) Applicant: Petelka Investments Inc., Puslinch (CA)

(72) Inventor: Brian W. Petelka, Puslinch (CA)

(73) Assignee: PETELKA INVESTMENTS INC., Ontario (CA)

(*) Notice: Subject to any disclaimer, the term of this patent is extended or adjusted under 35 U.S.C. 154(b) by 148 days.

(21) Appl. No.: 17/441,694

(22) PCT Filed: Mar. 20, 2020

(86) PCT No.: PCT/CA2020/050371
§ 371 (c)(1),
(2) Date: Sep. 21, 2021

(87) PCT Pub. No.: WO2020/186359
PCT Pub. Date: Sep. 24, 2020

(65) Prior Publication Data
US 2022/0185082 A1 Jun. 16, 2022

Related U.S. Application Data

(60) Provisional application No. 62/821,726, filed on Mar. 21, 2019.

(51) Int. Cl.
B60J 7/10 (2006.01)
B62D 33/04 (2006.01)

(52) U.S. Cl.
CPC .............. B60J 7/104 (2013.01); B62D 33/04 (2013.01)

(58) Field of Classification Search
None
See application file for complete search history.

(56) References Cited

U.S. PATENT DOCUMENTS

| 8,235,447 | B2 * | 8/2012 | Damsi | B60J 7/104 296/100.18 |
| 8,491,032 | B1 * | 7/2013 | Verduyn | B60J 5/065 296/100.12 |
| 9,579,959 | B2 * | 2/2017 | Beshiri | B60R 7/02 |
| 10,899,205 | B1 * | 1/2021 | Knight | B60J 7/102 |

(Continued)

Primary Examiner — Joseph D. Pape
(74) Attorney, Agent, or Firm — Jonathan Kidney; Intelink Law Group, P.C.

(57) ABSTRACT

Provided herein is an auto locking mechanism for use with a flat bed and a sliding tarpaulin system. The auto locking mechanism comprises a stationary guide having a longitudinal axis, where the stationary guide is securable to the flat bed between the flat bed and the sliding tarpaulin system, and a mobile component slidably coupled to the stationary guide along the longitudinal axis. The auto locking mechanism also includes an actuator that is operatively coupled to the mobile component. The actuator is adapted to impart motion to the mobile component relative to the stationary guide. The auto locking mechanism further includes an engagement arm secured to the mobile component for engagement with the sliding tarpaulin system. Movement imparted on the mobile component by the actuator slides the mobile component and the engagement arm relative to the stationary guide, thereby moving the sliding tarpaulin system relative to the flat bed.

17 Claims, 19 Drawing Sheets

(56) References Cited

U.S. PATENT DOCUMENTS

2009/0108622 A1*  4/2009  Damsi .................... B60J 7/102
                                                     296/100.15
2014/0197659 A1*  7/2014  Petelka .................. B60J 5/065
                                                     296/100.15

* cited by examiner

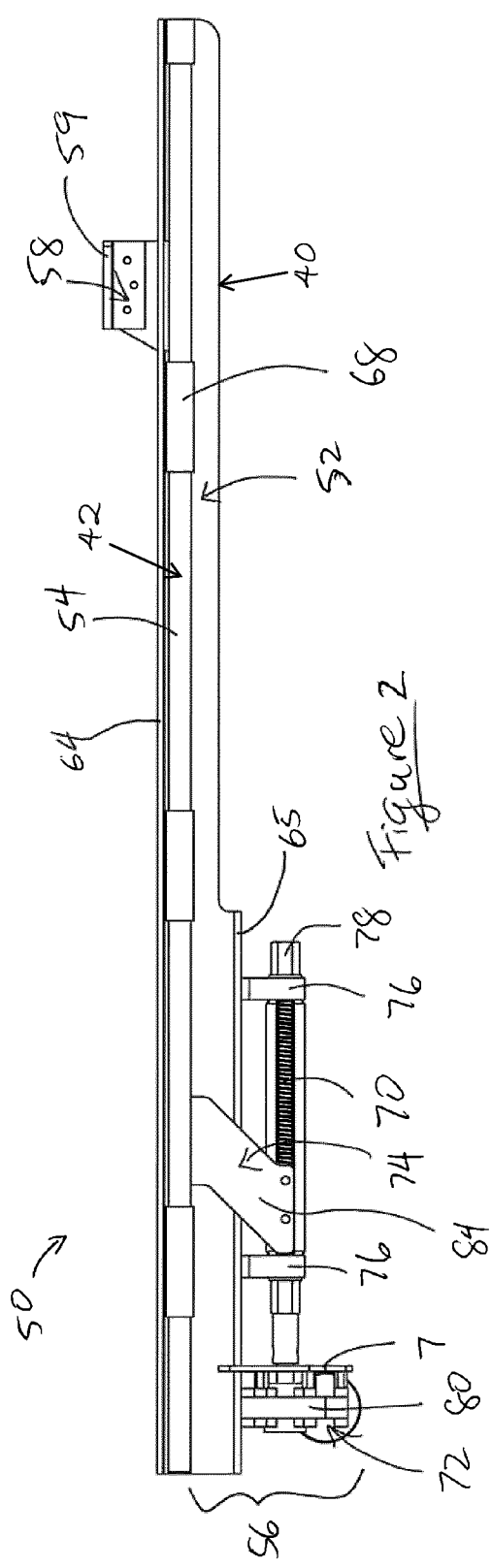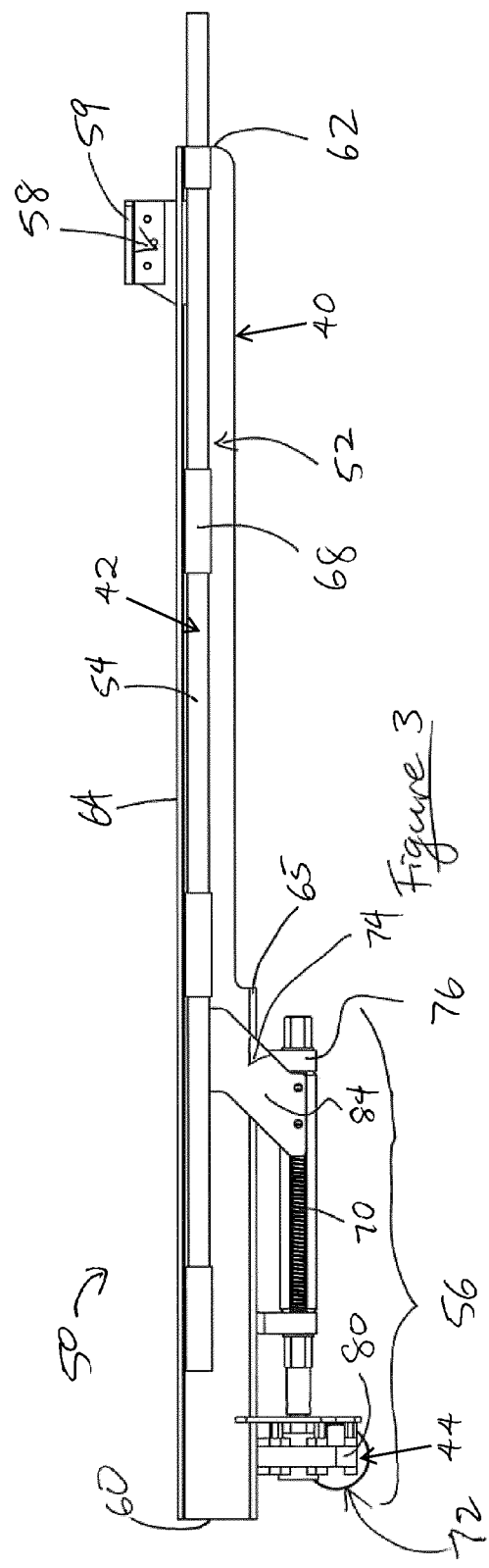

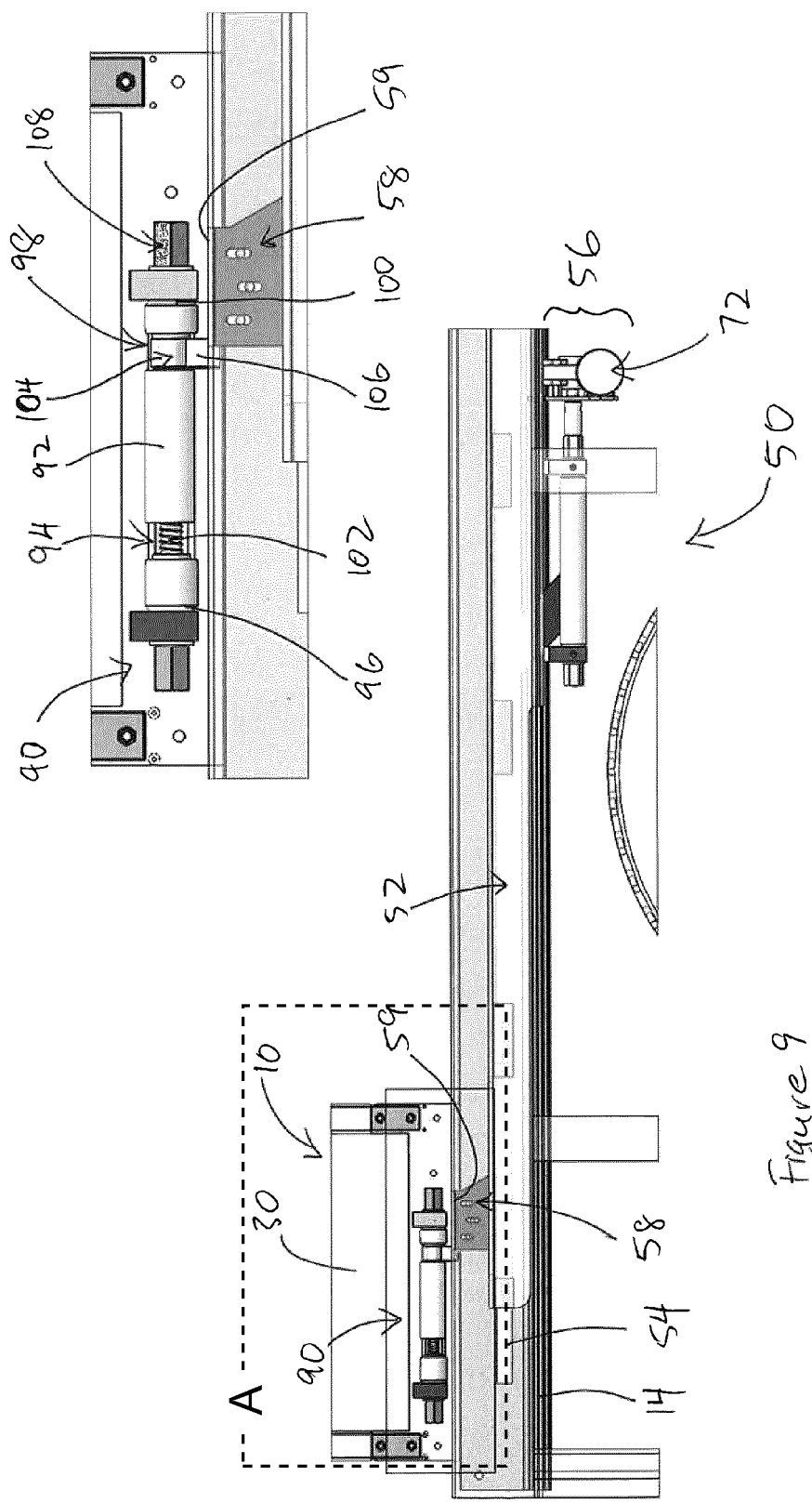

AUTO LOCKING MECHANISM

FIELD

The invention relates generally to tarpaulin systems for covering the open decks of flat bed vehicles and trailers. In particular, the invention relates to devices and systems for tensioning a tarpaulin that is deployed to cover the bed of a vehicle trailer, and locking said tarpaulin in place.

BACKGROUND

Trucks having trailers with flat beds, which are well known in the transportation industry, are commonly used for shipping goods, either locally, regionally or internationally. In order to protect goods loaded on the flat bed from exposure to the elements, vandalism or theft, the goods are typically covered with tarpaulins, or tarps.

Many types of systems exist that facilitate the covering and uncovering of a flat bed trailer with a tarp. By way of example, one type of system includes a plurality of arch-shaped frames, referred to as "cars", having wheels mounted at each end of the arch. These wheels are received by, and can slide in "C"-shaped tracks mounted on the sides of a flat bed, such that the arch of each of the cars extends over the surface of the flat bed. The cars are arranged at spaced intervals along the entire length of the flat bed, and a tarp extends over and is affixed to the arches of the cars to cover the flat bed.

The flat bed can be uncovered by sliding the car at the back of the flat bed towards the front, causing it and the other cars to gather at the front of the flat bed and the tarp to retract, exposing the flat bed. The flat bed can be re-covered by sliding the rear car toward the back of the flat bed again, causing the remaining cars to return to their original spaced apart positions and the tarp to unfurl, covering the flat bed. The system can also operate in the reverse manner, with the front car sliding to the rear car to expose the flat bed.

To prevent the tarp from opening while the truck is moving, to decrease the wind drag forces acting against the truck, and to increase the fuel efficiency of the truck, it is desirable that the tarp be locked in the closed position (that is, the position in which the tarp covers the flat bed), and that the tarp be taut while in the closed position. For flat beds having tarp systems as described above, the locking and tensioning of the tarp can be achieved by sliding the rear car as far to the rear of the flat bed as possible, and locking the rear car in place against sliding movement toward the front of the flat bed.

Canadian patent application No. 2,595,513 (the "'513 Application") discloses a mechanism for pulling the rear car as far to the rear of the flat bed as possible, and locking it in place. The '513 Application discloses a shaft assembly mounted to an interior surface of the rear car. The shaft assembly has a downward-facing slot formed therein and a second slot extending perpendicularly from one end of the downward-facing slot. Both of these slots provide access to a space within the shaft assembly. A threaded thrust shaft is provided within said space, and a threaded thrust nut is mounted on the thrust shaft within the thrust shaft space. The thrust nut has an arm extending radially outward through either the downward-facing slot or the second slot, depending on the position of the thrust nut along the thrust shaft, and out of the shaft assembly. The thrust shaft extends out a rear end of the shaft assembly, where a rotation nut is mounted on the thrust shaft. The mechanism can be operated by rotating the rotation nut, thus rotating the thrust shaft about its elongate axis.

While useful, the mechanism of the '513 Application must be manually activated and is secured on or above the deck of the interior of the flat bed. This can be problematic when the flat bed has been backed up to a loading dock, which may block access to the interior of the flat bed.

As well, the operation of the mechanism disclosed in the '513 Application requires the rotation of the rotation nut about an axis parallel to the length of the flat bed. Since the mechanism must be mounted on the rear car, which is effectively the side wall of the covered flat bed, and near the deck of the flat bed, gaining access to the rotation nut for rotation about this axis can be difficult.

SUMMARY

Disclosed herein is an auto locking mechanism for use with a flat bed and a sliding tarpaulin system, the auto locking mechanism comprising: a stationary guide having a longitudinal axis, the stationary guide being securable to the flat bed between the flat bed and the sliding tarpaulin system; a mobile component slidably coupled to the stationary guide along the longitudinal axis; an actuator operatively coupled to the mobile component, the actuator adapted to impart motion to the mobile component relative to the stationary guide; and an engagement arm secured to the mobile component for engagement with the sliding tarpaulin system, wherein movement imparted on the mobile component by the actuator slides the mobile component and the engagement arm relative to the stationary guide, thereby moving the sliding tarpaulin system relative to the flat bed.

Also disclosed herein is an auto locking mechanism for use with a sliding tarpaulin system, the auto locking mechanism comprising an elongate backboard plate having a longitudinal axis; a rail slidably coupled to the backboard plate along the longitudinal axis; a threaded shaft rotatably coupled to the backboard plate; a first transmission means operatively coupled with the shaft for imparting rotational motion to the shaft relative to the backboard plate; a drive member having a threaded coupler operatively circumscribing the threaded shaft, and a connector arm secured between the threaded coupler and the rail; and an engagement arm secured to the rail for engagement with the sliding tarpaulin system, wherein rotation of the threaded shaft by the first transmission means causes the shaft to rotate about its elongate axis, which in turn moves the threaded coupler of the drive member, and hence the connector arm, longitudinally along the shaft; and wherein movement of the connector arm slides the rail and the engagement arm relative to the backboard plate.

Further disclosed herein is the auto locking mechanism in combination with a tensioning and locking apparatus, the tensioning and locking apparatus comprising: an elongate rod housing for mounting on the sliding tarpaulin system, the rod housing comprising an elongate slot formed therein, a first transverse slot formed therein at one end of the elongate slot, a second transverse slot formed therein at another end of the elongate slot, the elongate slot and the first and second transverse slots in communication with each other; a threaded rod provided in the elongate slot; a threaded tensioning nut circumscribing the rod within the elongate slot, the tensioning nut having an arm extending therefrom through one of the elongate slot and the first and second transverse slots to an exterior of the rod housing.

In another embodiment, disclosed herein is an auto locking mechanism for use with a flat bed and a sliding tarpaulin system, the auto locking mechanism comprising: a barrel having a longitudinal axis, the barrel being securable to the flat bed between the flat bed and the sliding tarpaulin system; a piston slidably coupled to the barrel along the longitudinal axis, the barrel and the piston collectively forming a hydraulic cylinder; a hydraulic pump operatively coupled to the piston, the hydraulic pump adapted to impart motion to the piston relative to the barrel; and an engagement arm secured to the piston for engagement with the sliding tarpaulin system, wherein movement imparted on the piston by the hydraulic pump slides the piston and the engagement arm relative to the barrel, thereby moving the sliding tarpaulin system relative to the flat bed.

Directional references herein such as "front", "rear", "up", "down", "horizontal", "top", "bottom", "side" and the like are used purely for convenience of description and do not limit the scope of the present disclosure. Furthermore, any dimensions provided herein are presented merely by way of an example and unless otherwise specified do not limit the scope of the disclosure. Furthermore, geometric terms such as "straight", "flat", "curved", "point" and the like are not intended to limit the disclosure to any specific level of geometric precision, but should instead be understood in the context of the disclosure, taking into account normal manufacturing tolerances, as well as functional requirements as understood by a person skilled in the art.

BRIEF DESCRIPTION OF THE DRAWINGS

Reference will now be made, by way of example, to the accompanying drawings which show example embodiments of the present application.

FIG. 2 is a side view of an auto locking mechanism according an example embodiment of the present invention in a first configuration.

FIG. 3 is a side view of the auto locking mechanism according of FIG. 2 in a second configuration.

FIG. 9 is a side view of the auto locking mechanism of FIG. 8.

FIG. 10 is an enlarged view of portion A of FIG. 9.

Similar reference numerals may have been used in different figures to denote similar components.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention.

DESCRIPTION OF EXAMPLE EMBODIMENTS

Example embodiments of the improved tarp tensioning and locking apparatus of the present invention will now be described with reference to the attached figures.

Figure 1:
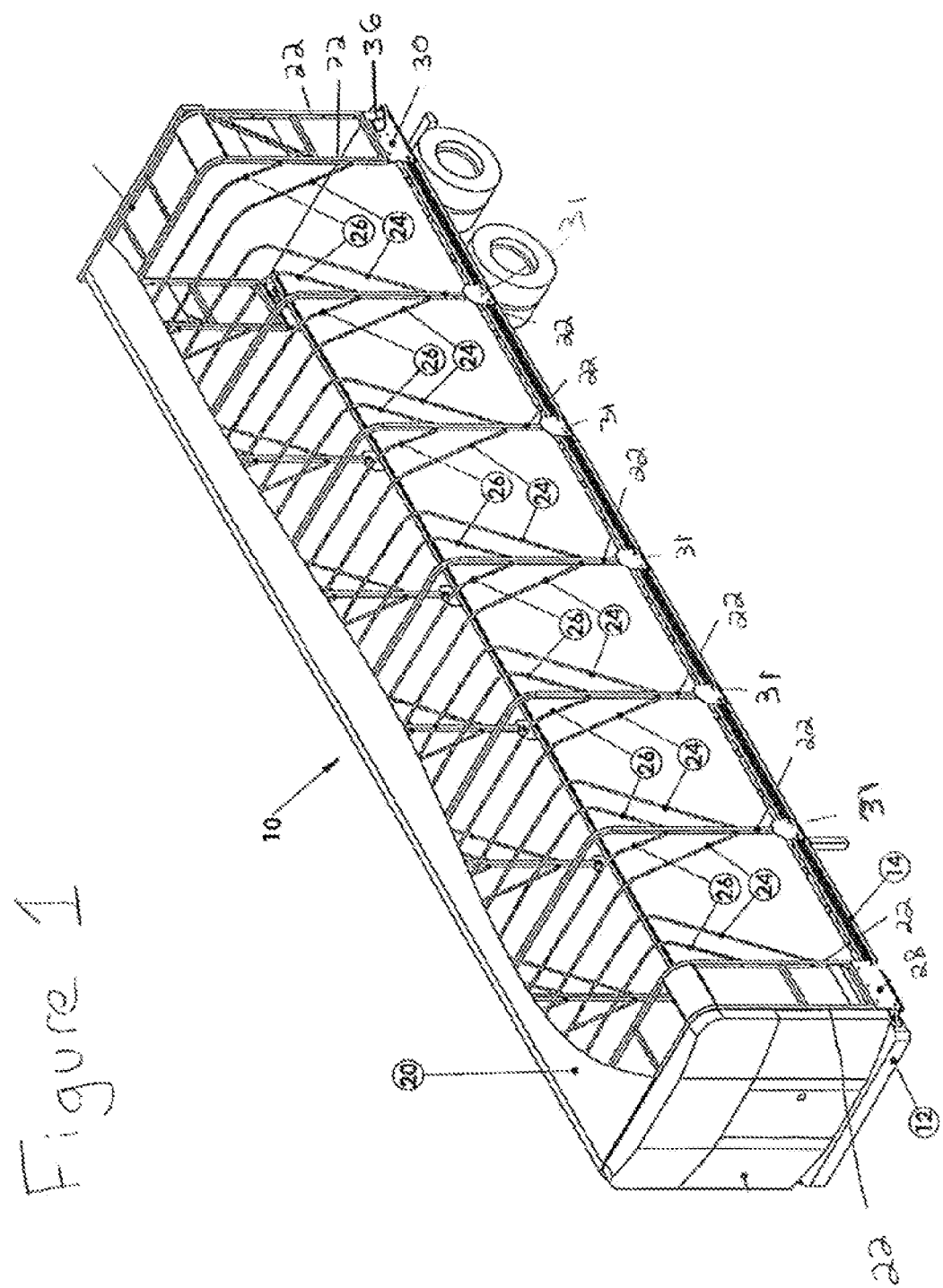
FIG. 1 is a perspective view of a flatbed trailer having a tarp covering system with which the present invention can be used.

FIG. 1 illustrates a flat bed trailer having one example of a sliding tarpaulin system 10 with which the auto locking mechanism and the tarp tensioning and locking apparatus of the present invention can be used. The trailer comprises a rectangular flat bed 12 having elongate left and right sides and transverse front and rear sides. The flat bed 12 is mounted on wheels at its rear end. The flat bed 12 has rolling tarp tracks or "C"-shaped tracks 14 mounted on its left and right sides.

Sliding tarpaulin system 10 is depicted as having a plurality of arch-shaped assemblies arranged in a spaced-apart configuration along the length of the flat bed 12. Each of the assemblies comprise at least one arch 22 and an end assembly known as a "car" 28, 30, 31 at each end of the arch 22. The assemblies at the front and rear of the flat bed 12 comprise two arches 22 connected at their ends to a front car 28 and rear car 30, respectively. The other assemblies each comprise one arch 22 connected at each end to a middle car 31.

Each of the arches 22 has double uplifters 24 and quad uplifters 26 pivotally mounted thereto. These uplifters 24 and 26 are arch-shaped members that hang off the arches 22 at an angle such that top portions of the uplifters 24 and 26 and the arches 22 rest in substantially the same plane. A tarp 20 extends over each of the arches 22 and uplifters 24 and 26, covering the flat bed 12. The tarp 20 is removably affixed to each of the arches 22 and uplifters 24 and 26.

The flat bed 12 can be uncovered by sliding the rear car 30 toward the front of the flat bed 12, or alternatively by sliding the front car 28 toward the rear of the flat bed 12. Such movement causes the tarp 20 to bunch up, which causes the uplifters 24 and 26 to pivot upwards toward the arches 20. This pivotal movement lifts sections of the tarp 20 upward and out of the space between the arches 22, allowing the arches 22 to move closer together as the rear car 30 moves backward (or the front car 28 moves forward) pushing the middle cars along with it.

It can easily be seen that the flat bed 12 can be recovered by sliding the rear car 30 back toward the rear of the flat bed 12 (or by sliding the front car 28 back toward the front of the flat bed 12). To pull the tarp 20 taut, the rear car 30 can be pulled backward along the tracks 14 as far as possible. To lock the tarp 20 in such a closed, taut position, the rear car 30 can be restrained from moving forward along the tracks 14 until it is desired that the flat bed 12 be uncovered.

Such tensioning of tarp 20 and locking of rear car 30 can be accomplished with auto locking mechanism of the present invention. The present auto locking mechanism generally comprises a stationary guide 40 with a longitudinal axis, where stationary guide 40 is securable to flat bed 12 between flat bed 12 and the sliding tarpaulin system 10. The present auto locking mechanism includes a mobile component 42 that is slidably coupled to stationary guide 40 along the longitudinal axis. The present auto locking mechanism further includes an actuator 44 that is operatively coupled to mobile component 42. Actuator 44 is adapted to impart motion to mobile component 42 relative to stationary guide 40.

The present auto locking mechanism also includes an engagement arm 58 that is secured to mobile component 42 for engagement with sliding tarpaulin system 10. In that manner, movement imparted on mobile component 42 by actuator 44 slides mobile component 42 and engagement arm 58 relative to stationary guide 40, thereby moving sliding tarpaulin system 10 relative to flat bed 12.

Figure 4:
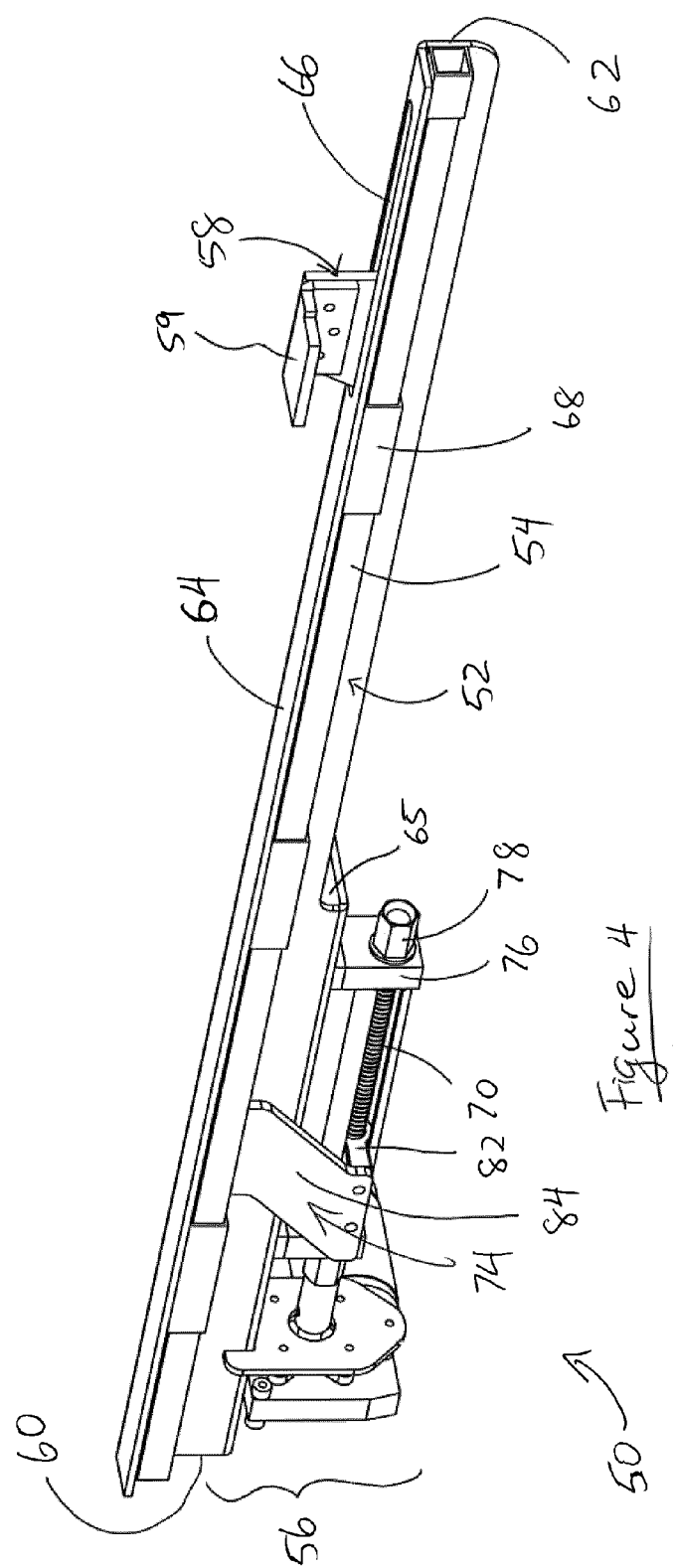
FIG. 4 is a perspective view of the auto locking mechanism according of FIG. 2.

A first embodiment of the auto locking mechanism, referred to herein with reference character 50, is shown in isolation in FIGS. 2-4 and mounted to flat bed 12 in FIGS. 5-10. A second embodiment of the auto locking mechanism, referred to herein with reference character 150, is shown in isolation in FIGS. 11-13 and mounted to flat bed 12 in FIGS. 14-15. A third embodiment of the auto locking mechanism, referred to herein with reference character 250, is shown in isolation in FIGS. 16-19 and mounted to flat bed 12 in FIGS. 20-21.

Auto locking mechanism 50 can be mounted to flat bed 12, or rear car 30, in any suitable manner, such as by threaded bolts extending through mounting holes formed in mechanism 50 and into receiving holes formed in the flat bed 12 of rear car 30. Auto locking mechanism 50 may be used with sliding tarpaulin system 10.

Auto locking mechanism 50 stationary guide 40 is an elongate backboard plate 52, mobile component 42 is a rail 54 that is slidably coupled to backboard plate 52. Auto locking mechanism 50 also includes an under mount 56 secured to backboard plate 52 and rail 54 to control sliding of rail 54 relative to backboard plate 52, and engagement arm 58 secured proximate to a distal end of rail 54.

Elongate backboard plate 52 has a longitudinal axis extending between a first end 60 and a second end 62. Elongate backboard plate 52 is further shown to have an upper ledge 64 and a lower ledge 65. Both upper and lower ledges 64, 65 are shown extending generally perpendicularly therefrom in opposite directions. While upper ledge 64 extends between first end 60 and second end 62, lower ledge 65 extends from first end 60 and terminates before reaching second end 62. Upper ledge 64 has or defines an arm slot 66 positioned proximate second end 62. However, while upper ledge 64 may be included to help cover/protect components situated underneath and/or provide structural support to backboard plate 52, upper ledge 64 may not be present in alternate embodiments or may extend at a different angle from backboard plate 52.

Rail 54 is shown to have a slim rectangular tubular shape. In the present embodiment, rail 54 has a width of no more than 3 inches and a height of 3 inches or less. In particular, rail 54 in the depicted embodiment has a cross-sectional height and width of 2.25 inches. It would be understood that rail 54 may have different dimensions so long as rail 54 can fit and be positioned within the critical gap (G) formed between flat bed 12 and rolling tarp tracks 14 (see FIG. 7 for example). While rail 54 is shown to have a rectangular tubular shape with a square cross-section, other shapes may be used including a circular tubular shape or a rectangular tubular shape with a rectangular cross-section. In other applications, rail 54 may be solid or partially filled, rather than being hollow inside.

Rail 54 is slidably coupled to backboard plate 52 along longitudinal axis and, as shown, is slidably secured thereto via square brackets 68. As understood by the skilled person, rail 54 may be slidably secured to backboard plate 54 using other means known in the art.

Engagement arm 58 is secured to rail 54 and extends through critical gap G and away from rail 54 for engagement with a transmission component (discussed further below) on cars 28, 30, 31 and/or sliding tarpaulin system 10. In the depicted embodiment, engagement arm 58 extends from rail 54 through arm slot 66 in upper ledge 64. The transmission component acts to transfer or transmit motion from rail 54 to cars 28, 30, 31 and/or sliding tarpaulin system 10.

In the first embodiment shown in FIGS. 1-10, engagement arm 58 includes a stopper 59 which is generally planar and extends perpendicularly away from engagement arm 58 for engagement with cars 28, 30, 31 and/or sliding tarpaulin system 10. In the second embodiment shown in FIGS. 11-15, stopper 59 includes two hooks 61 for engagement with cars 28, 30, 31 and/or sliding tarpaulin system 10. As understood by the skilled person, other embodiments of stopper 59 may be used so long as stopper 59 engages and transmits motion from rail 54, via the transmission component, to cars 28, 30, 31 and/or sliding tarpaulin system 10.

Under mount 56 as shown is secured to lower ledge 65 and generally includes a threaded shaft 70, actuator 44, and a drive member 74. In auto locking mechanism 50, actuator 44 is a first transmission means 72.

Threaded shaft 70 is rotatably coupled to backboard plate 52 and secured spaced apart from lower ledge 65 by end brackets 76 and a threaded nut 78, which is placed on one end of threaded shaft 70 to prevent threaded shaft 70 from sliding out of under mount 56.

First transmission means 72 is secured at the opposite end of threaded shaft 70, opposite nut threaded 78, and is operatively coupled to threaded shaft 70 for imparting rotational motion to threaded shaft 70 relative to backboard plate 52. In the embodiment depicted, first transmission means 72 is a motor 80. In alternate embodiments, rather than a motor, first transmission means 72 may instead comprise a manual mechanism, such as a crank with a handle, by which it may impart rotational motion to threaded shaft 70.

Drive member 74 has a threaded coupler 82 operatively circumscribing threaded shaft 70, and a connector arm 84 secured between threaded coupler 82 and rail 54.

Figure 11:
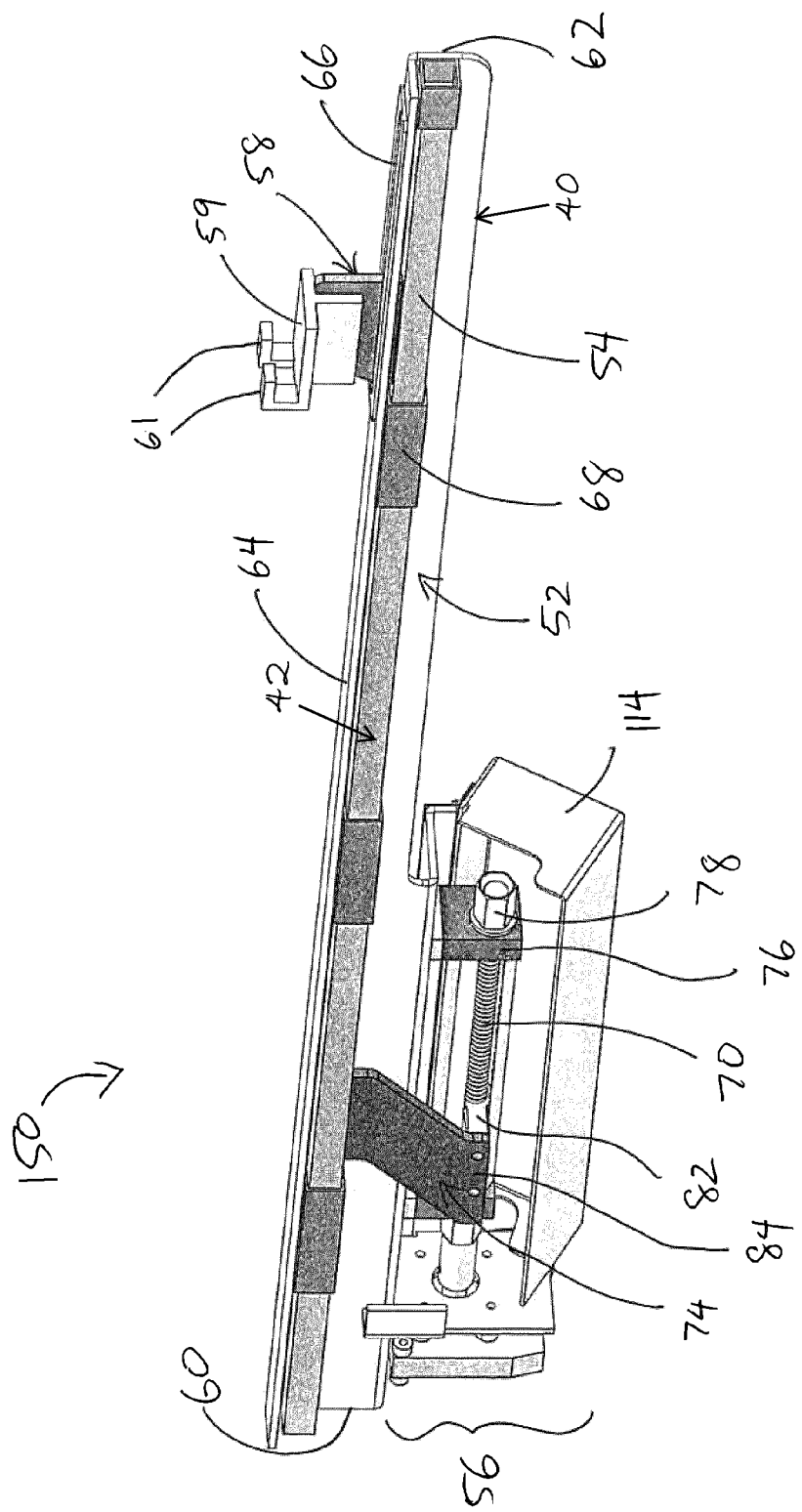
FIG. 11 is a front perspective view of an auto locking mechanism according a second example embodiment of the present invention.
Figure 12:
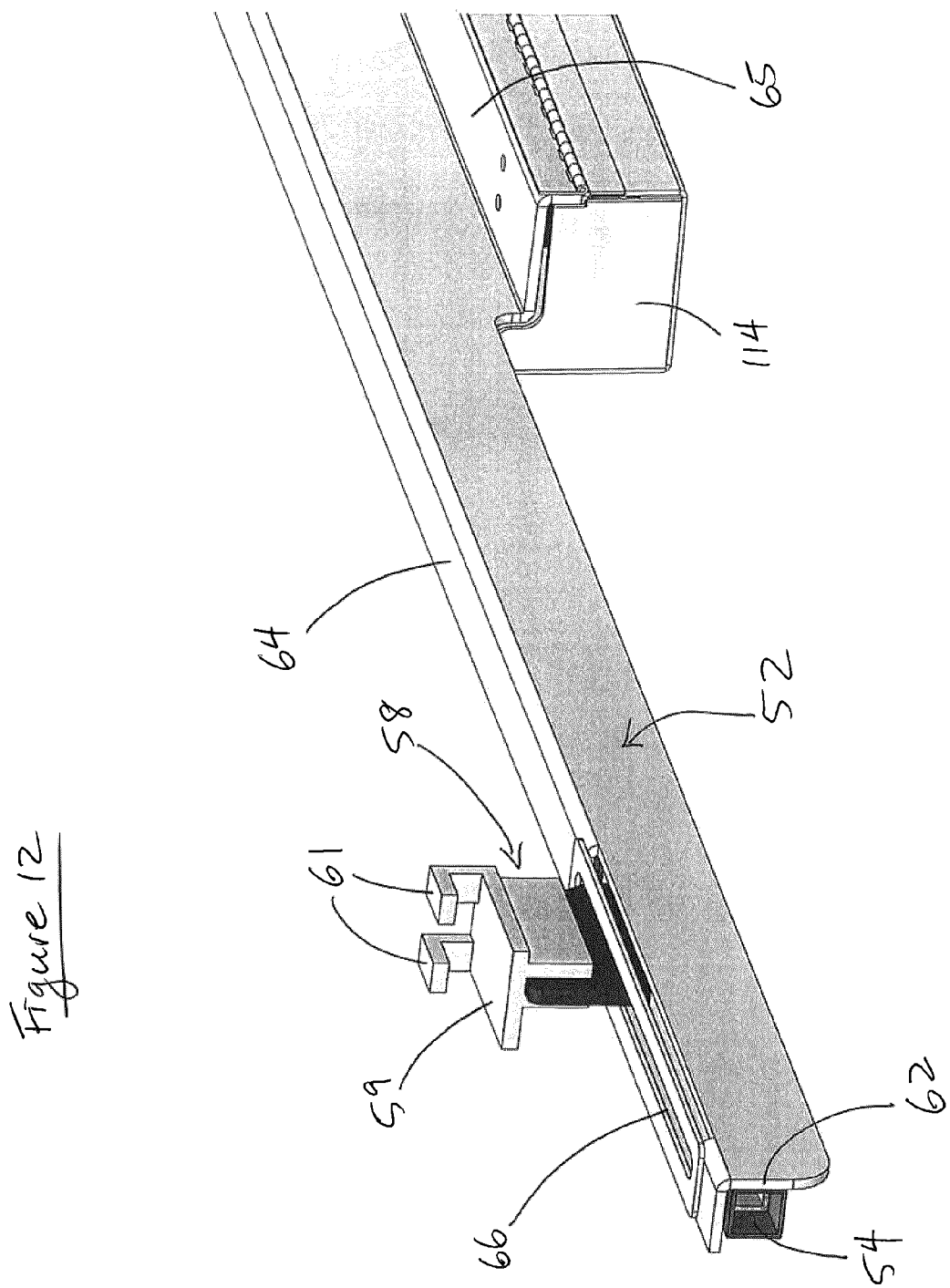
FIG. 12 is an enlarged back perspective view of a second end of FIG. 11.
Figure 13:
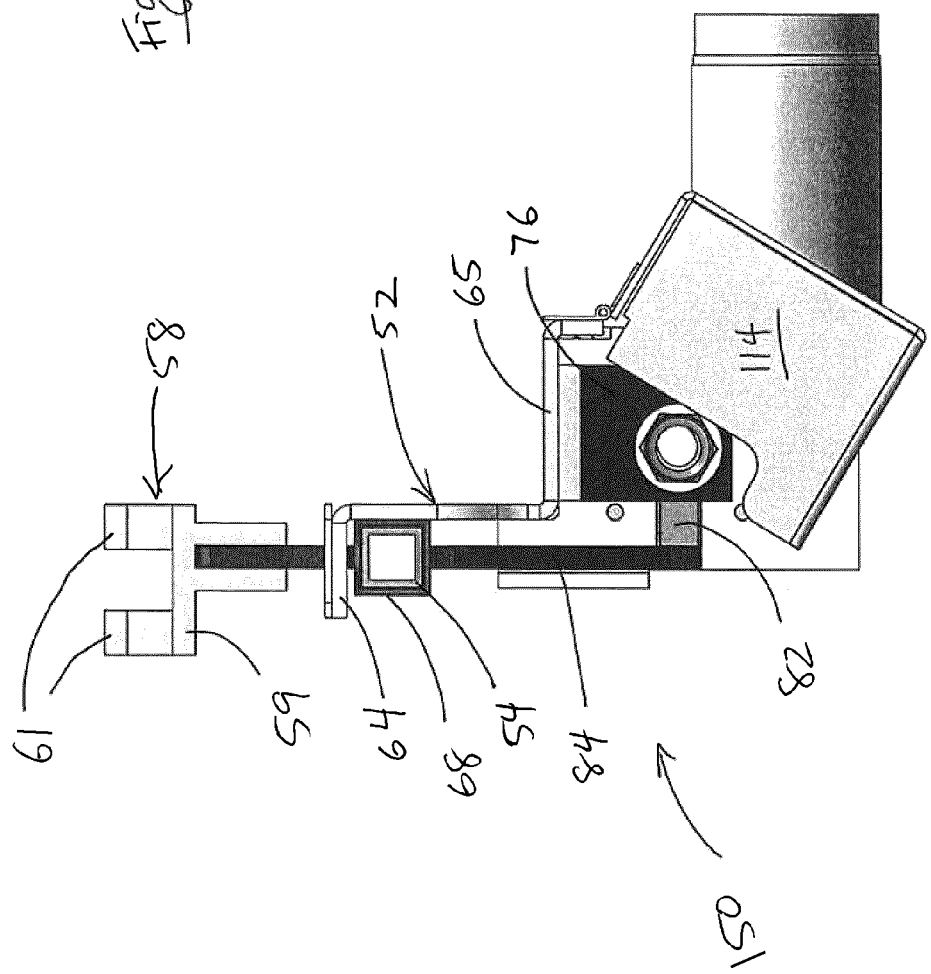
FIG. 13 is a right side view of the auto locking mechanism of FIG. 11.

In the second embodiment shown in FIGS. 11 and 12, under mount 56 further includes a housing 114 which surrounds and protects threaded shaft 70 and drive member 74.

As note above, engagement arm 58 is secured and positioned proximate second end 62 of backboard plate 52, while under mount 56 is secured and positioned proximate first end 60 of backboard plate 52.

In this manner, when threaded shaft 70 is rotated about its elongate axis by first transmission means 72, rotation of threaded shaft 70 moves threaded coupler 82 of drive member 74, and thereby connector arm 84, longitudinally along threaded shaft 70, i.e. along its elongate axis. As connector arm 84 moves along the elongate axis of threaded shaft 70, it in turn slides rail 54 and engagement arm 58 relative to backboard plate 52.

Figure 5:
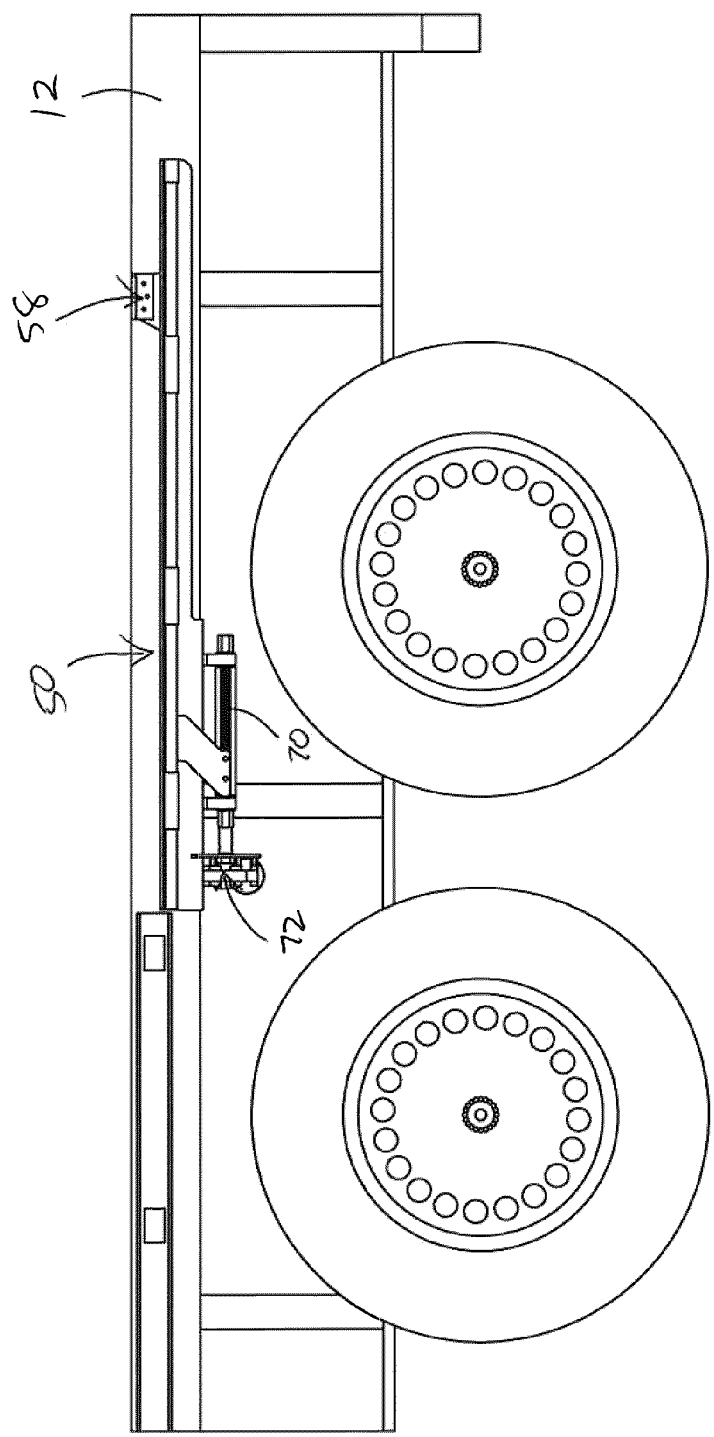
FIG. 5 is a side view of the auto locking mechanism of FIG. 2 attached to the trailer of FIG. 1 without a track system.
Figure 6:
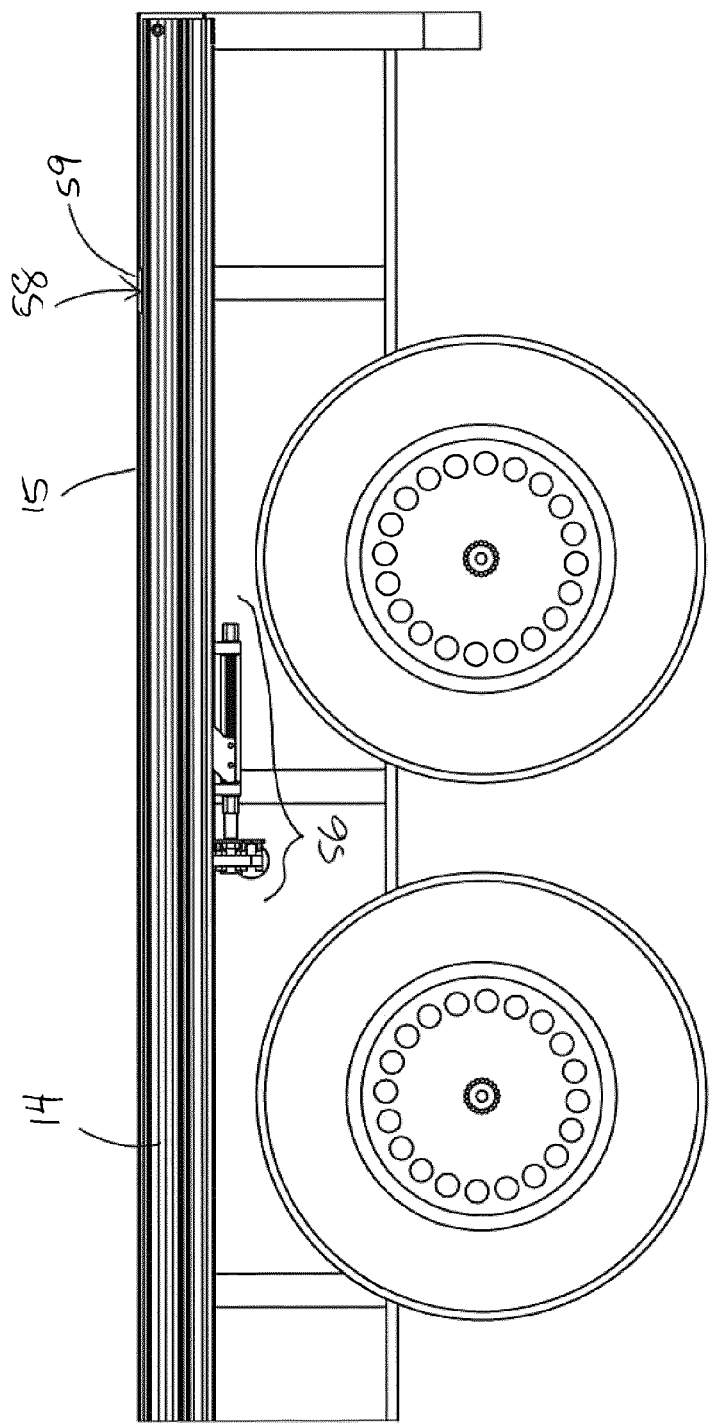
FIG. 6 is a side view of the auto locking mechanism of FIG. 5 with a track system.
Figure 7:
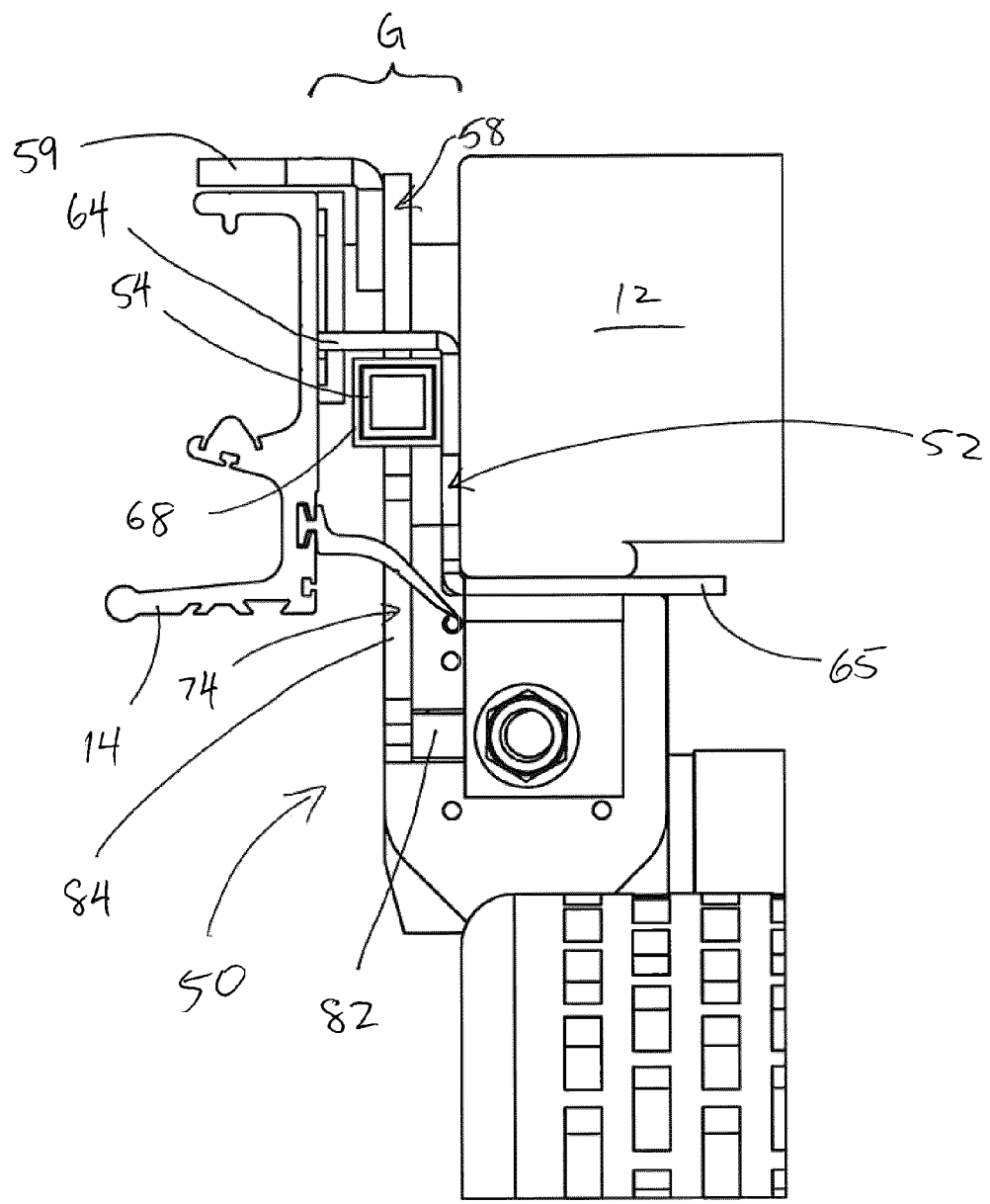
FIG. 7 is an enlarged rear view of the auto locking mechanism of FIG. 6.

FIGS. 5-10 show one example of how the first embodiment of auto locking mechanism 50 may be mounted to flat bed 12 and/or track 14. As best seen in FIGS. 5 and 6, for example, backboard plate 52 is securable to truck deck or flat bed 12 such that threaded shaft 70 and first transmission means 72, or under mount 56, generally hangs below flat bed 12 in use. Moreover, engagement arm 58 extends to or above an upper surface 15 of track 14.

Auto locking mechanism 50 may further include or be used in combination with a number of different transmission components. For example, the transmission component may simply be a flange (not shown) that extends from the frame of car 28, 30, or 31 to catch or engage with stopper 59 of engagement arm 58.

Figure 8:
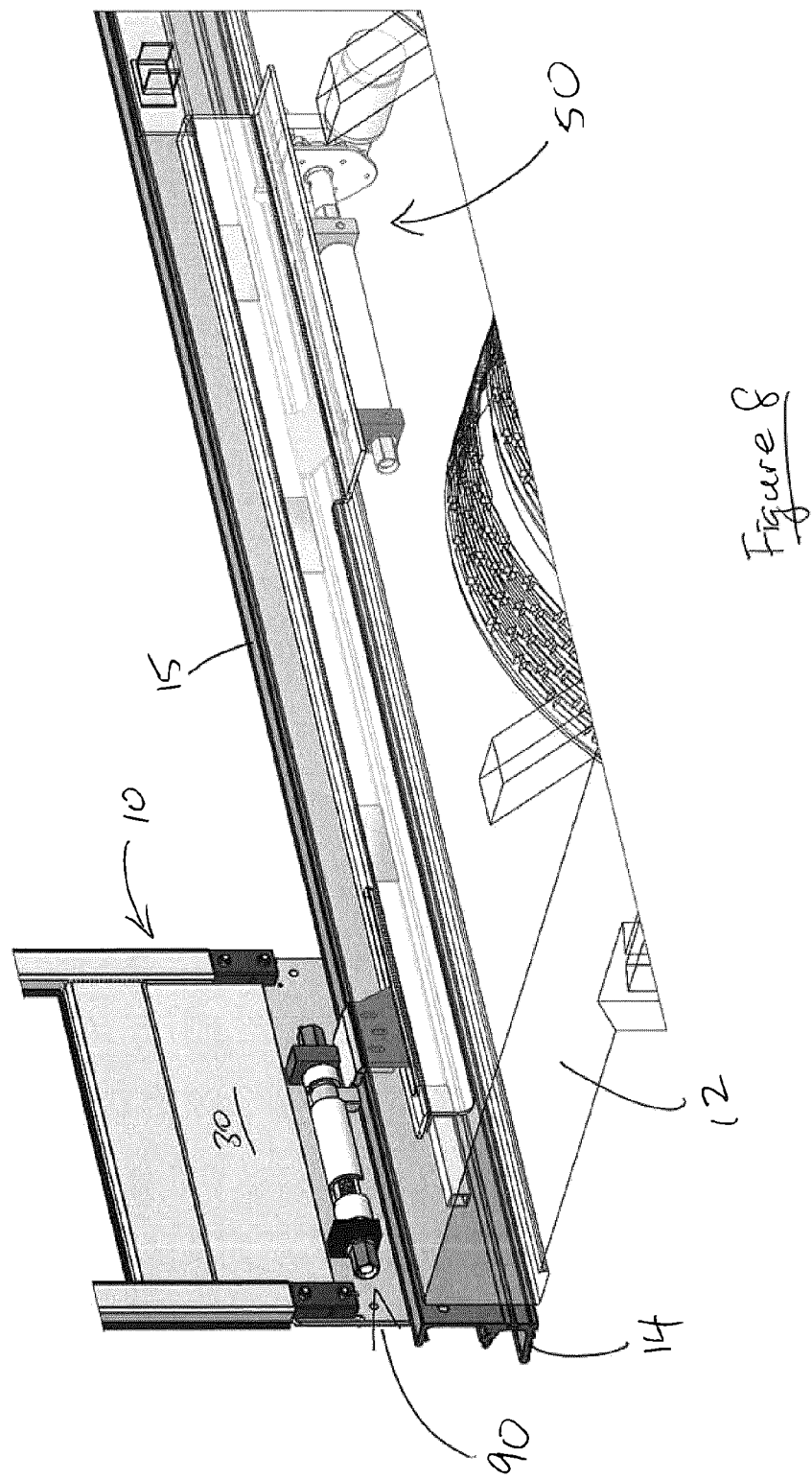
FIG. 8 is a partial internal perspective view of the auto locking mechanism of FIG. 3 attached to the trailer of FIG. 1 without a trailer deck.

Turning to FIGS. 8-10, an alternate transmission component is shown, that being a tensioning and locking apparatus 90. Tensioning and locking apparatus 90 may be the tensioning and locking apparatus described in U.S. Pat. No. 7,798,553, US 20140197659 or another tensioning and locking apparatus known in the art.

In the depicted embodiment, tensioning and locking apparatus 90 includes an elongate rod housing 92 for mounting on cars 28, 30, 31 and/or sliding tarpaulin system 10. Rod housing 92 itself comprises an elongate slot formed therein, a first transverse slot 94 formed therein proximate a back end 96 of rod housing 92, and a second transverse slot 98 formed therein proximate an opposite front end 100 of end of rod housing 92, where second transverse slot 98 is positioned closer to under mount 56 in use. The elongate slot and first and second transverse slots 94, 98 are in communication with one another.

Tensioning and locking apparatus 90 includes a threaded rod 102 positioned in the elongate slot and a threaded tensioning nut 104 circumscribing rod 102 within the elongate slot. Tensioning nut 104 has an arm 106 extending therefrom through one of the elongate slot and first and second transverse slots 94, 98 to an exterior of rod housing 92.

A second transmission means 108 may be included in tensioning and locking apparatus 90, which is operatively coupled with rod 102 for imparting rotational motion to rod 102. In the depicted embodiment, second transmission means 108 is a threaded nut.

Rotation of threaded rod 102 by second transmission means 108 may cause rod 102 to rotate about its elongate axis. Rotation of rod 102 about its elongate axis causes tensioning nut 104 to rotate about said axis, which in turn, causes tensioning nut arm 106 to move along one of the elongate slot and into first or second transverse slots 94, 98.

Tensioning of the tarp 20 and locking of the rear car 30 can be accomplished with the first embodiment of auto locking mechanism 50 and tensioning and locking mechanism 90 of the present invention, which is mounted to flat bed 12 and rear car 30 respectively.

Auto locking mechanism 50 can be mounted flat bed 12 in any suitable manner, such as by threaded bolts extending through mounting holes formed in auto locking mechanism 50 and into receiving holes formed in the flat bed 12. Tensioning and locking mechanism 90 can be mounted to rear car 30 in any suitable manner, such as by threaded bolts extending through mounting holes formed in tensioning and locking mechanism 90 and into receiving holes formed in the rear car 30.

The presence of tensioning nut 104 in either first or second transverse slots 94, 98 with tensioning nut arm 106 in the downwardly extending position allows auto locking mechanism 50 to engage proximate one end 96 or 100 of tensioning and locking apparatus 90 and tensioning nut 104 to the opposite end to tighten the tarp 20. For example, as seen in FIGS. 8-10, tensioning and locking apparatus 90 is secured to rear car 30 (which in turn is secured to sliding tarpaulin system 10) and tensioning nut arm 106 is positioned in a downward position within second transverse slot 98 of tensioning and locking apparatus 90.

In the present case, engagement arm 58 acts as a system stopper for engaging tensioning and locking apparatus 90 and preventing the rear car 30 from moving forward past engagement arm 58. As noted above, engagement arm 58 extends to or above the upper surface 15 of track 14 adjacent to tensioning and locking apparatus 90. When tensioning and locking apparatus 90 engages with stopper 59 of engagement arm 58, tensioning and locking apparatus 90 exerts force against engagement arm 58 in a forward direction. Since the engagement arm 58 is coupled to flat bed 12 and/or track 14 via auto locking mechanism 50, the exerted force on tensioning and locking apparatus 90 by engagement arm 58 causes rear car 30 to slide further backward along tracks 14, pulling tarp 20 taut. As well, the engagement of tensioning and locking apparatus 90 with engagement arm 58 prevents rear car 30 from sliding forward along tracks 14, thus locking rear car 30 and tarp 20 in a closed position.

The user can continue engaging first transmission means 72 to push engagement arm 58, and tensioning and locking apparatus 90 further backwards until the desired tension in the tarp is reached. When sliding motion of rail 54 and engagement arm 58 stops, the rear car 30 and tarp 20 may be locked in place by the engagement of the tensioning nut arm 106 with engagement arm 58.

To open sliding tarpaulin system 10, the process is reversed. Retraction of rail 54 and engagement arm 58, or their forward motion, causes engagement arm 58 to move away from tensioning nut 104 and tensioning nut arm 106. When tensioning nut arm 106 is in the upwardly extended position through one of first or second transverse slots 94, 98, it cannot engage engagement arm 58. The rear car 30 is then free to slide forward of engagement arm 58.

In this first embodiment, moreover, second transmission means 108 of tensioning and locking apparatus 90 may also be engaged in the manner described above to drive/move car 30 furthers backwards in addition to the movement induced by auto locking mechanism 50. Alternately, tensioning and locking apparatus 90 may act as a manual over-ride in case auto locking mechanism 50 malfunctions.

Figure 14:
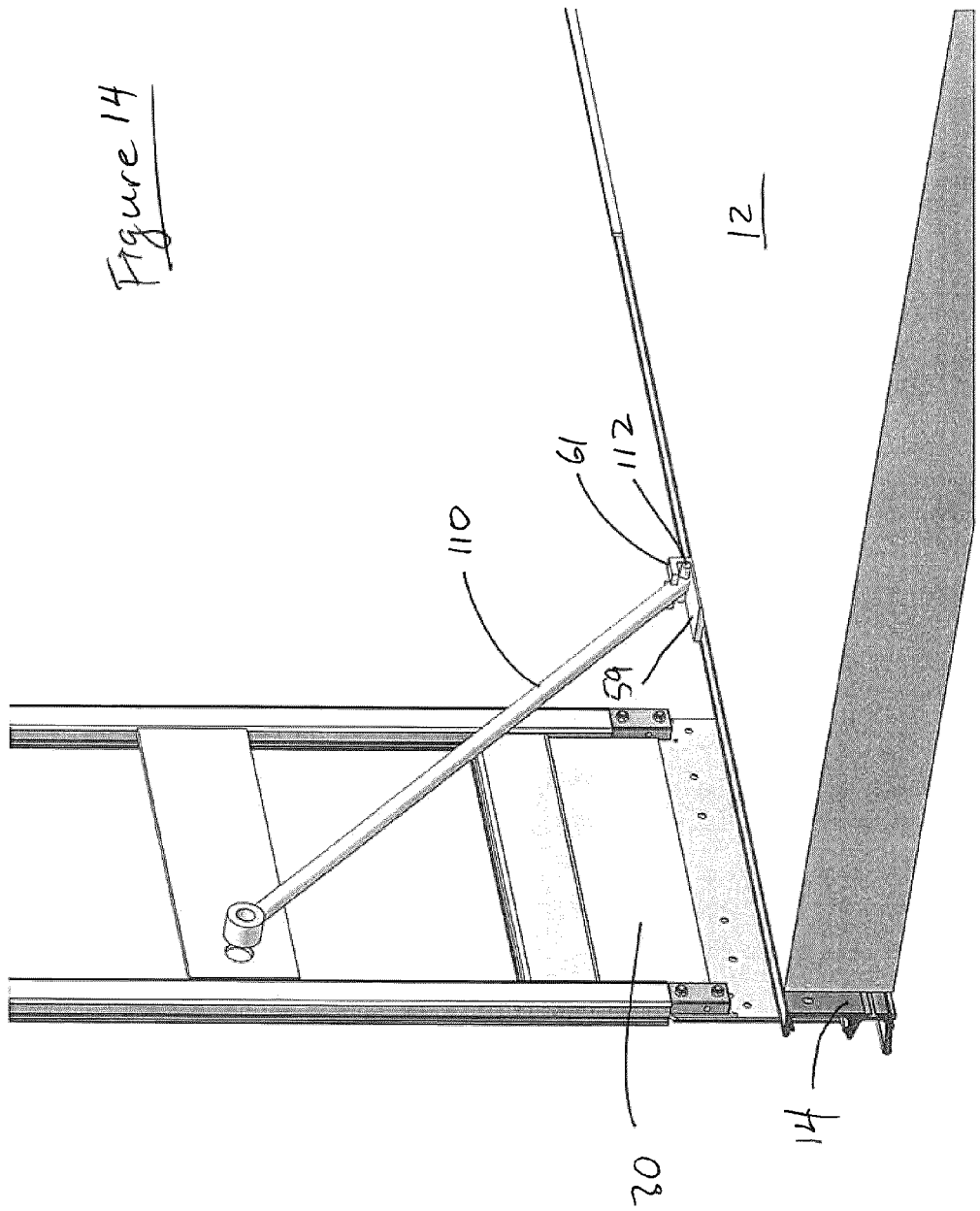
FIG. 14 is an internal perspective view of the auto locking mechanism of FIG. 11 attached to the trailer of FIG. 1.
Figure 15:
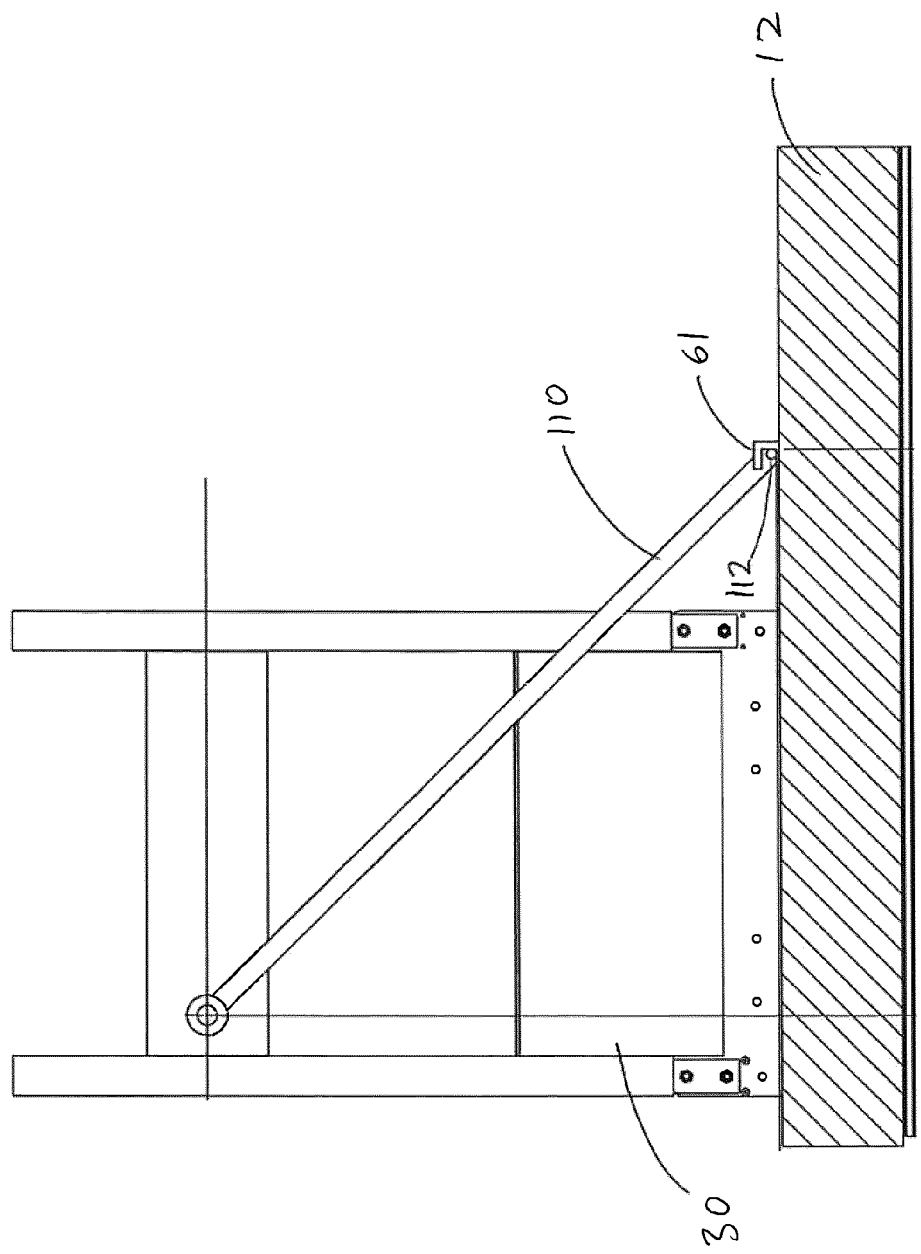
FIG. 15 is a back view of the auto locking mechanism of FIG. 14.
Figure 16:
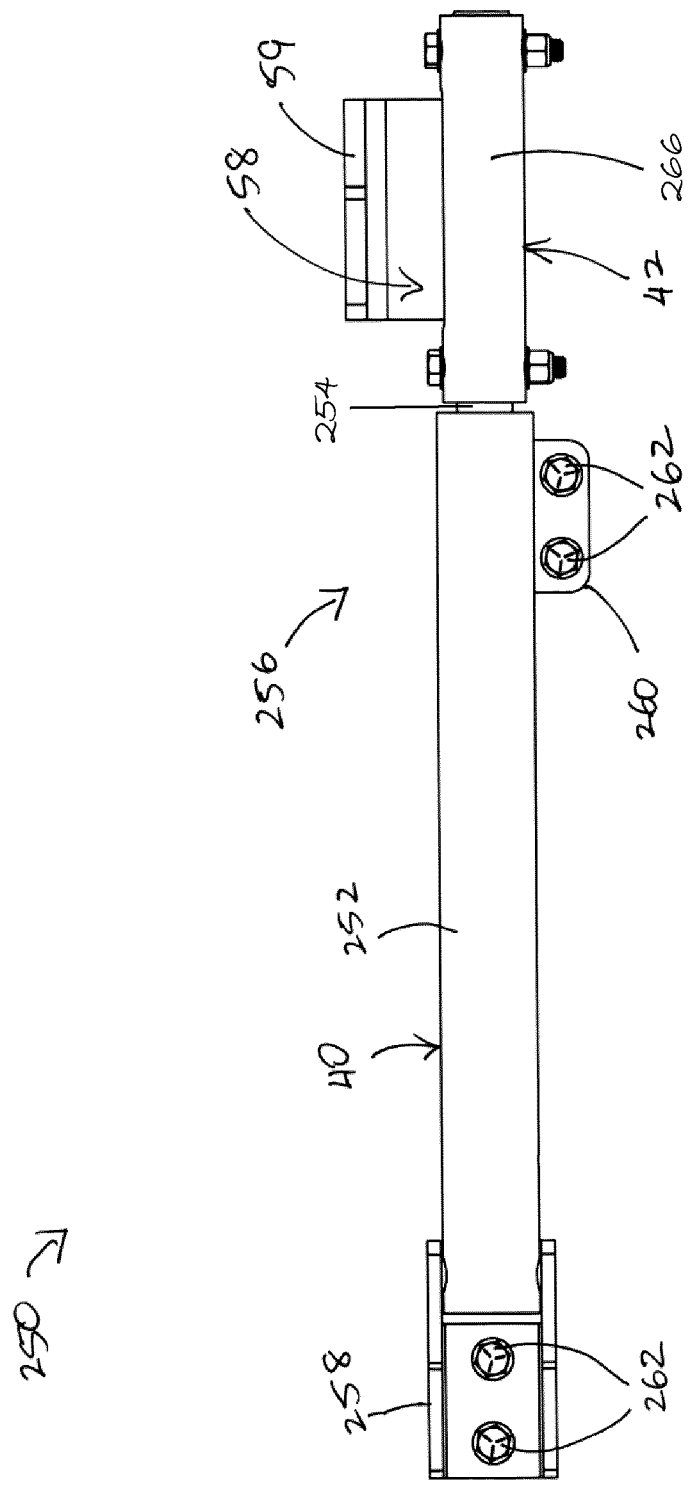
FIG. 16 is a side view of an auto locking mechanism according a third example embodiment of the present invention in a first configuration.
Figure 17:
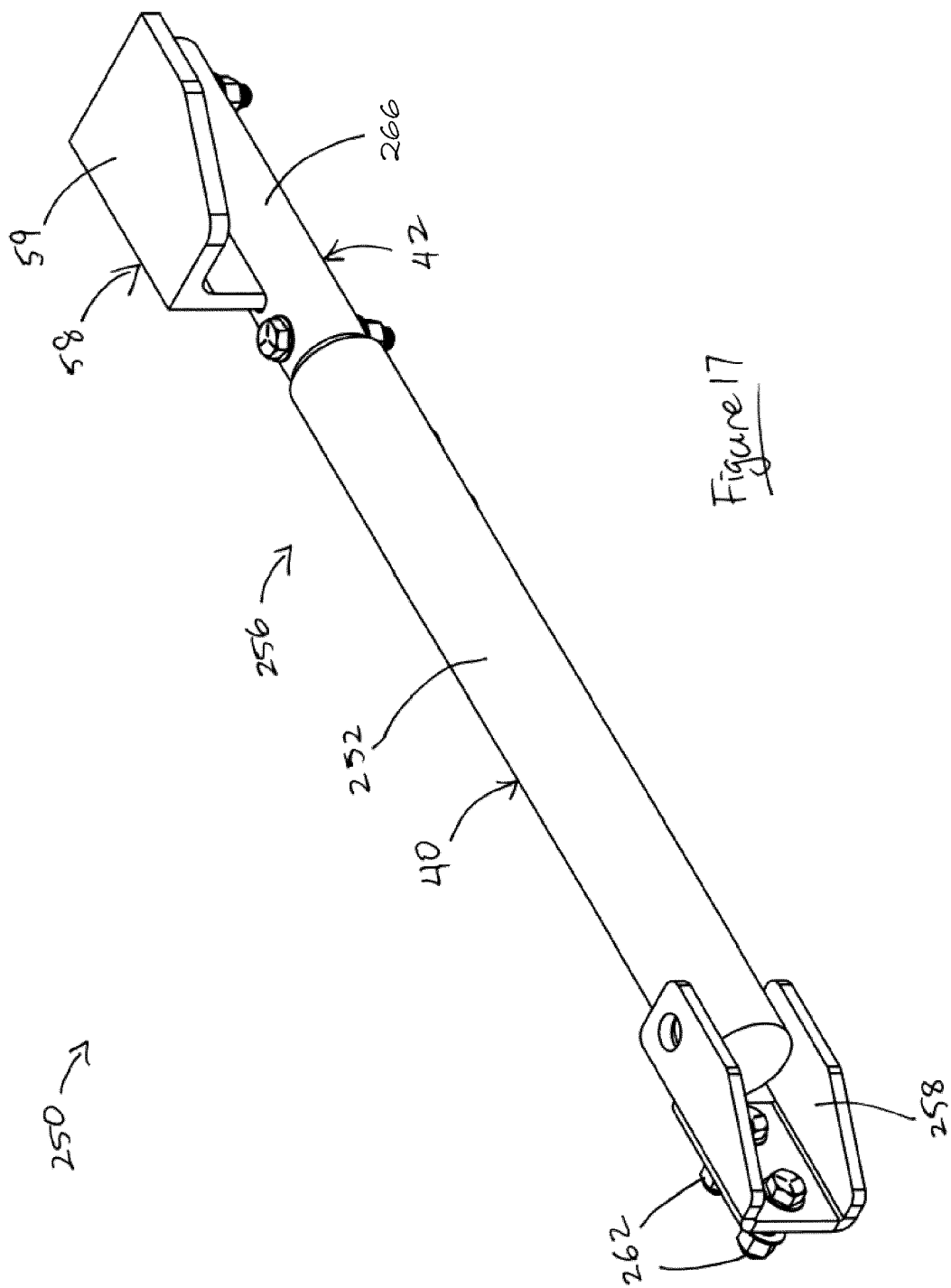
FIG. 17 is a front perspective view of the auto locking mechanism of FIG. 16.
Figure 18:
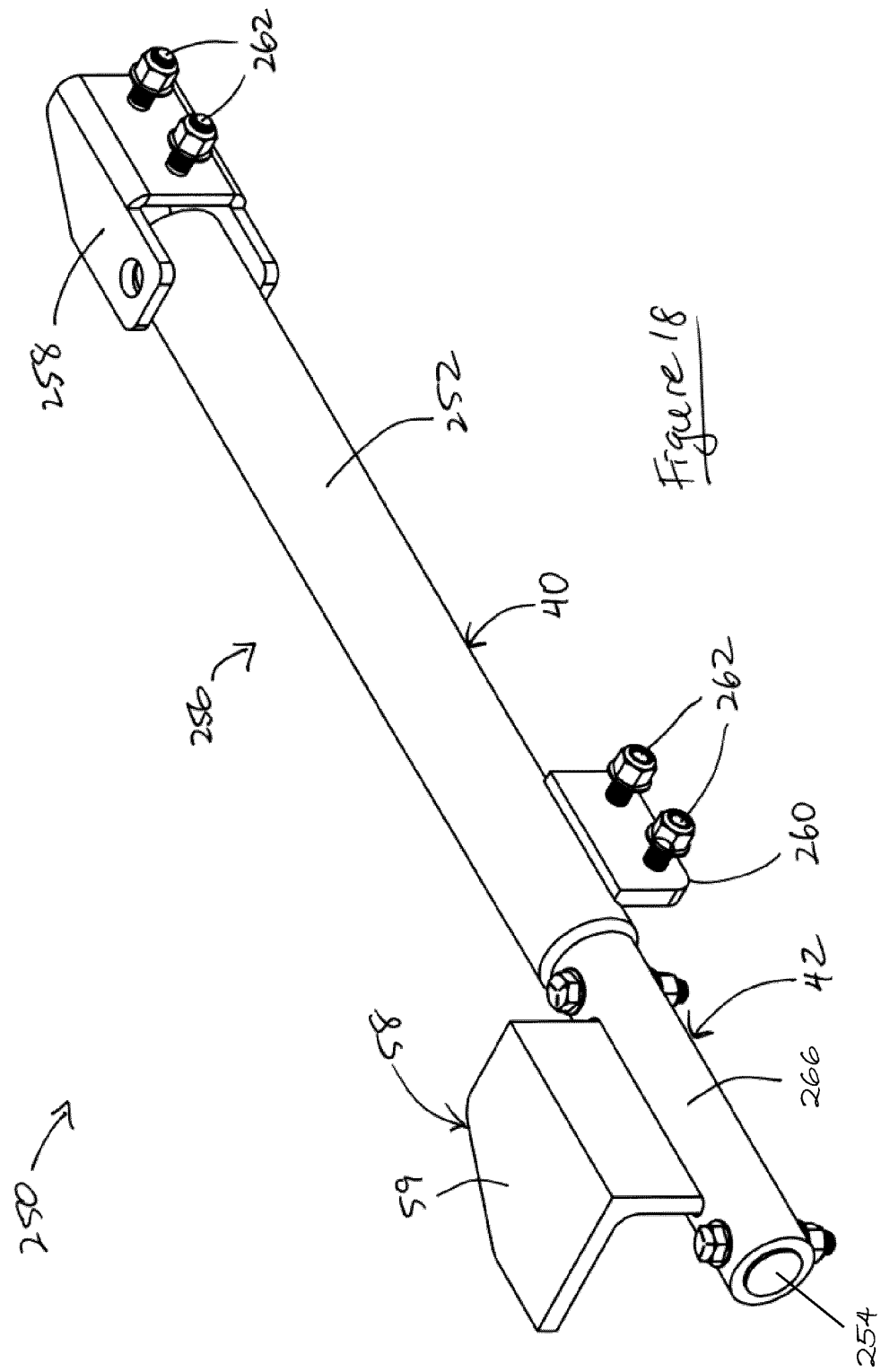
FIG. 18 is a rear perspective view of the auto locking mechanism of FIG. 16.
Figure 19:
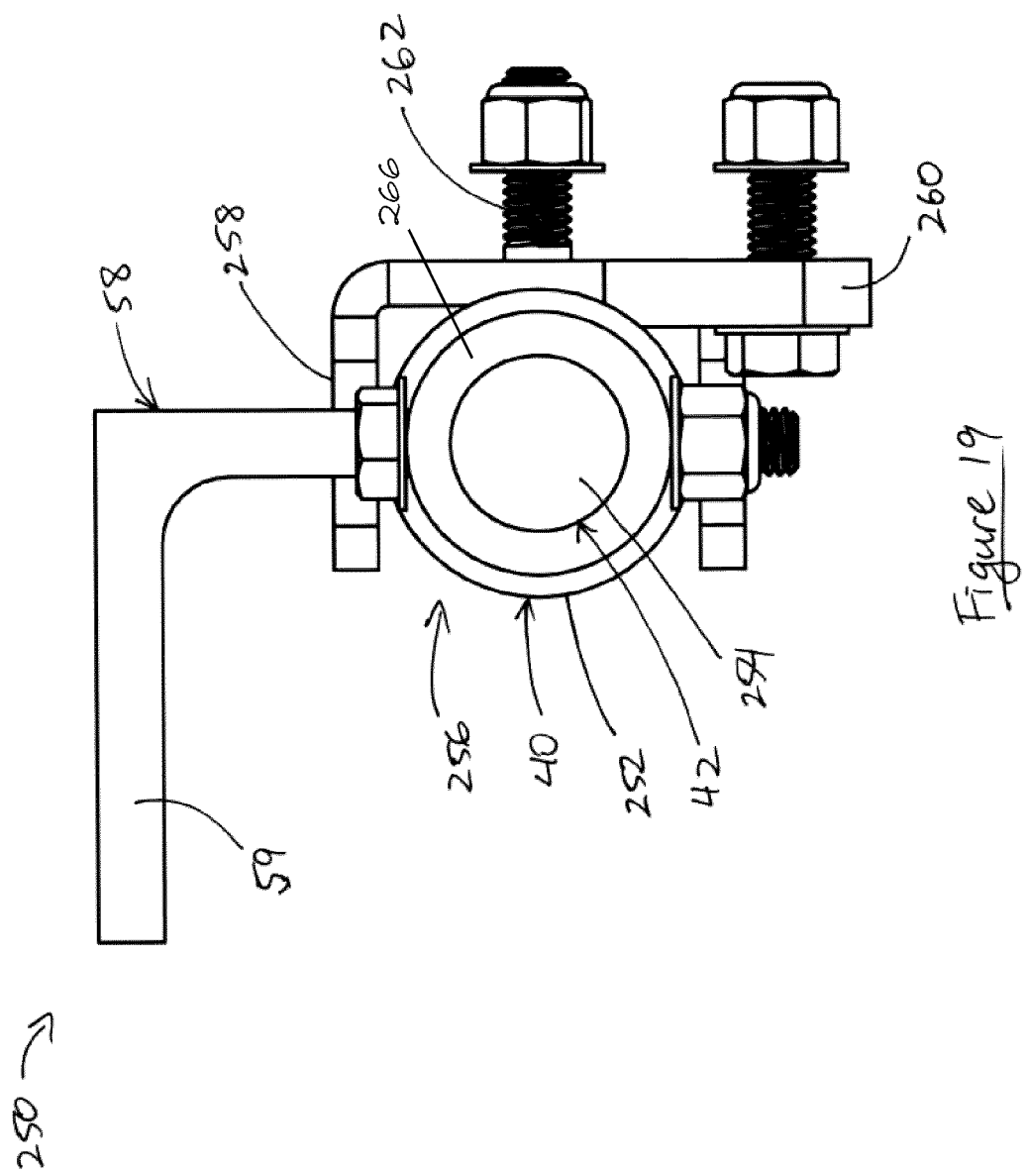
FIG. 19 is an enlarged rear view of the auto locking mechanism of FIG. 16.

FIGS. 14-15 show one example of how the second embodiment of auto locking mechanism 150 may be coupled to flat bed 12 and/or track 14. Similar to the first embodiment, backboard plate 52 is securable to flat bed 12 such that threaded shaft 70 and first transmission means 72, or under mount 56, generally hangs below flat bed 12 in use. Moreover, hooks 61 of stopper 59 is shown to extend above upper surface 15 of track 14.

In the second embodiment of auto locking mechanism 150, the depicted embodiment includes, or is used in combination with, a support bar 110 rather than tensioning and locking apparatus 90 as the transmission component. Support bar 110 has protrusions 112 at one end for engagement with hooks 61 of engagement arm 58. Support bar 110 is further securable, perhaps rotationally so, to car 28, 30, 31. In this manner, support bar may be rotatably secured to car 30 at an angle between 30-60 degrees.

In a similar manner as tensioning and locking apparatus 90, when support bar 110 engages with stopper 59 of engagement arm 58, and motor 80 is engaged to slide stopper 59 backwards, stopper 59 also exerts force against support bar 110 in a backwards direction. This exerted force on support bar 110 by engagement arm 58 causes rear car 30 to slide further backward along tracks 14, pulling tarp 20 taut. As well, the engagement of support bar 110 with engagement arm 58 prevents rear car 30 from sliding forward along tracks 14, thus locking rear car 30 and tarp 20 in a closed position.

However, in contrast to tensioning and locking apparatus 90, support bar 110 may be secured at a higher point on car 30, at an angle to flat bed 12. In this manner, support bar 110 may provide support and apply force to an upper portion of the frame structure of car 30, helping to retain the car frame in a generally vertical position and prevent bending of the car frame. This may help to maintain or increase the tautness of tarp 20. Tarp systems tend to be plagued by the force of exterior winds that wrap around the rear of a trailer applying forcing and wanting to push the rear car 30 frame forward. Support bar 110 may help to reinforce the frame and ensure that the car frame is held taut. When tension in tarp 20 is relieved, support bar 110 can travel with the frame of car 30 when auto locking mechanism 50 is opened or it can be quickly & easily removed.

In alternate embodiments, not shown, tensioning and locking apparatus 90 may be used together with support bar 110, optionally, as a manual over-ride in case auto locking mechanism 50 malfunctions.

Figure 20:
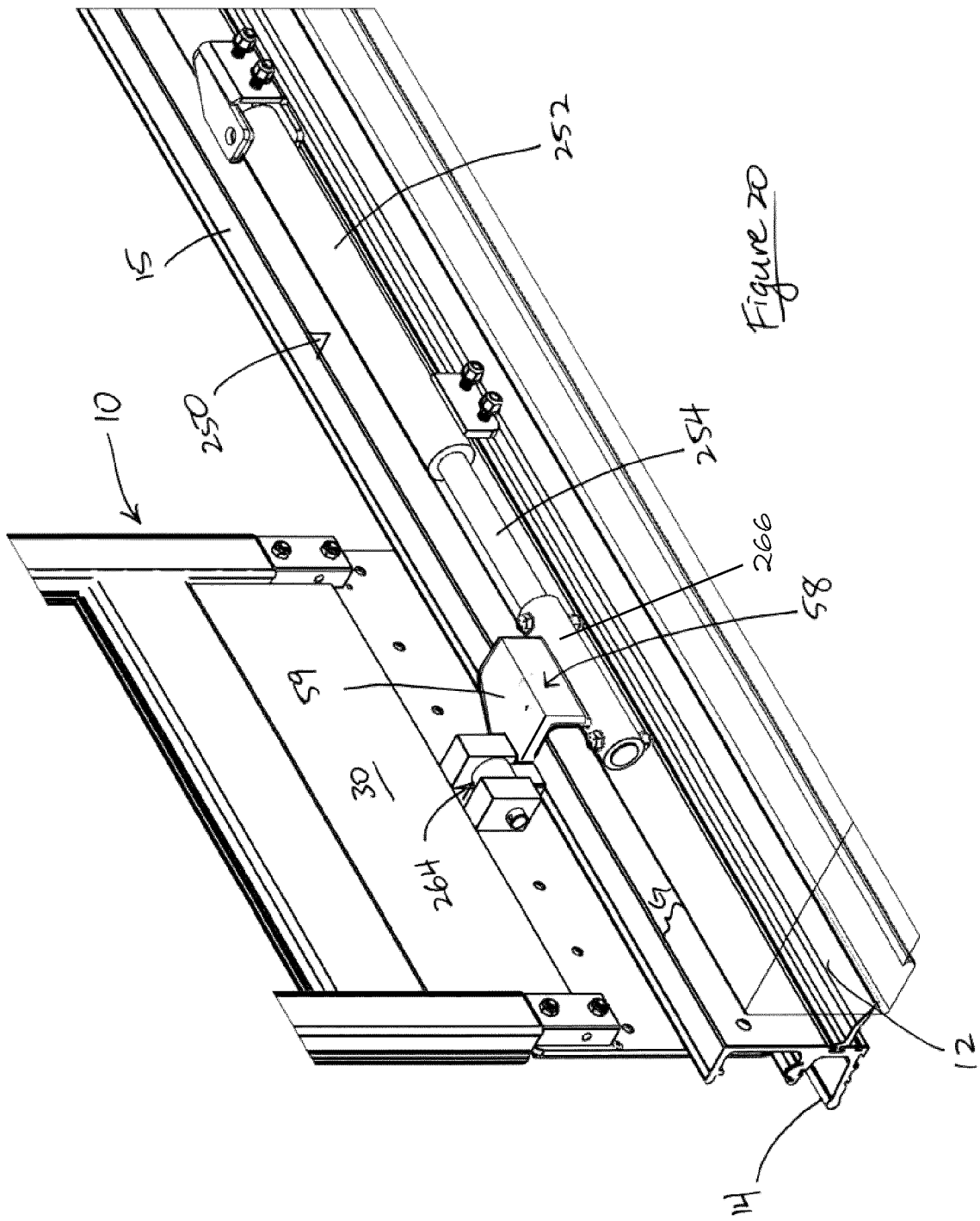
FIG. 20 is a perspective view of the auto locking mechanism of FIG. 18 in a second configuration with a track system.
Figure 21:
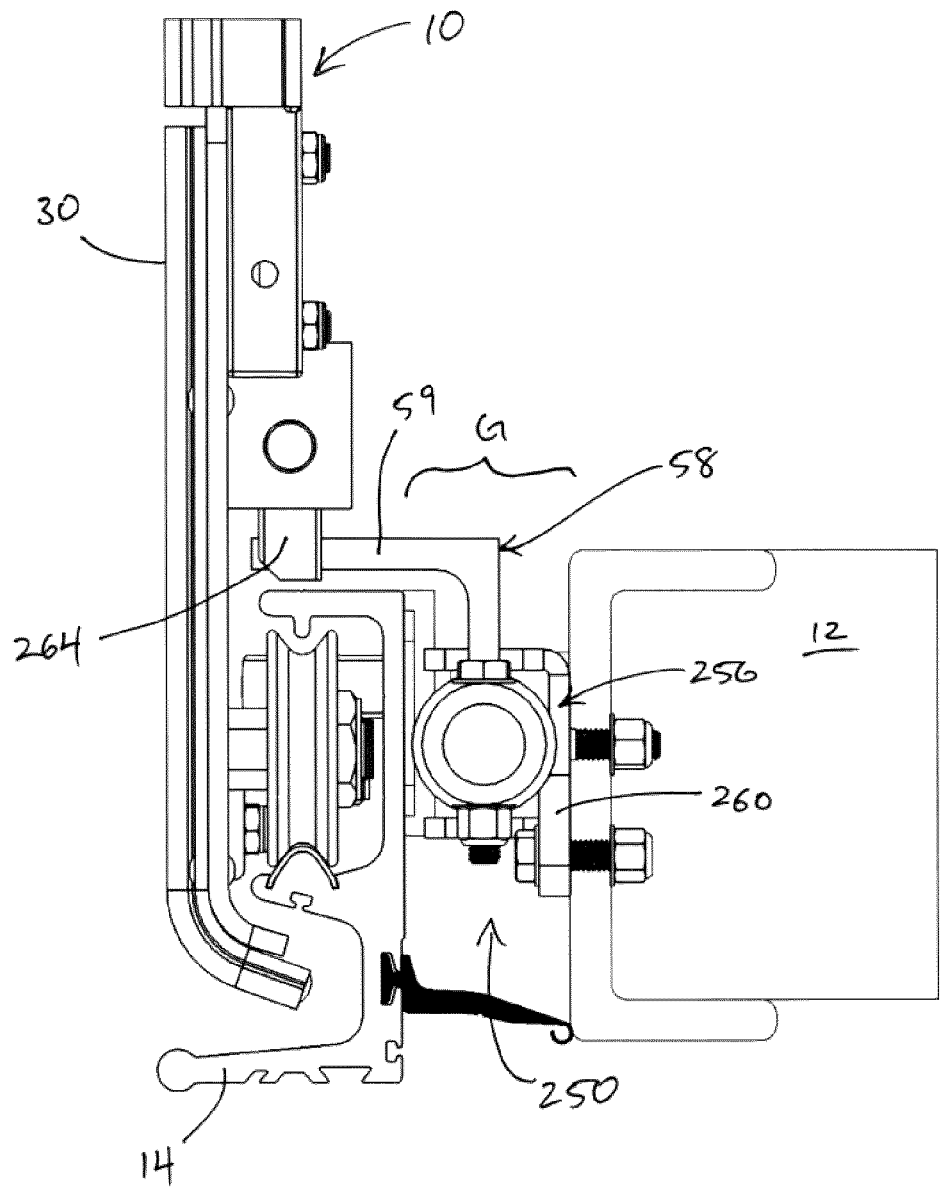
FIG. 21 is an enlarged rear view of the auto locking mechanism of FIG. 20.

A third embodiment of auto locking mechanism 250 is shown in isolation in FIGS. 16-19 and mounted to flat bed 12 in FIGS. 20-21.

In auto locking mechanism 250, stationary guide 40 is a barrel 252, and mobile component 42 is a piston 254 that is slidably coupled within barrel 252. In that regard, barrel 252 and piston 254 collectively form a hydraulic cylinder 256, and actuator 44 is a hydraulic pump (not shown) that is adapted and operatively coupled to hydraulic cylinder 256 to deliver fluid to hydraulic cylinder 256 to move piston 254.

Unlike first and second embodiments of auto locking mechanism 50, 150, third embodiment of auto locking mechanism 250, as depicted, does not include threaded shaft 70, drive member 74, upper ledge 64 or lower ledge 65.

Hydraulic cylinder 256 is shown to have a slim cylindrical shape with a diameter of no more than 3 inches. In particular, hydraulic cylinder 256 in the depicted embodiment has a diameter of 2.25 inches. It would be understood that hydraulic cylinder 256 may have different dimensions so long as hydraulic cylinder 256 can fit and be positioned within the critical gap (G) formed between flat bed 12 and rolling tarp tracks 14 (see FIG. 21 example). Hydraulic cylinder 256 may be formed with the required cap, gland, sliding rings, and seals, as known in the art.

Similar to first and second embodiments of auto locking mechanism 50, 150, third embodiment of auto locking mechanism 250 includes engagement arm 58. With auto locking mechanism 250, engagement arm 58 is secured to piston 254 via a brace 266. Engagement arm 58 extends through critical gap G and away from piston 254 for engagement with a transmission component (discussed further below) on cars 28, 30, 31 and/or sliding tarpaulin system 10. The transmission component acts to transfer or transmit motion from piston 254 to cars 28, 30, 31 and/or sliding tarpaulin system 10.

Engagement arm 58 of auto locking mechanism 250 also includes stopper 59 which is generally planar and extends perpendicularly away from engagement arm 58 for engagement with cars 28, 30, 31 and/or sliding tarpaulin system 10. As understood by the skilled person, other embodiments of stopper 59 may be used so long as stopper 59 engages and transmits motion from piston 254, via the transmission component, to cars 28, 30, 31 and/or sliding tarpaulin system 10.

As noted above, auto locking mechanism 250 includes a hydraulic pump. While not shown in the figures, the hydraulic pump may include a hydraulic motor and oil reservoir that may be secured under flat bed 12, similar to under mount 56, or secured on top of flat bed 12. The hydraulic pump may be coupled to auto locking mechanism 250 by wiring that goes to the front plug of the trailer.

Similar to under mount 56 in the second embodiment shown in FIGS. 11 and 12, the present hydraulic pump may be situated in a housing (not shown) which surrounds and protects the hydraulic motor and oil reservoir.

Auto locking mechanism 250 can also be mounted to flat bed 12, or rear car 30, in any suitable manner, such as by threaded bolts extending through mounting holes formed in auto locking mechanism 250 and into receiving holes formed in the flat bed 12 of rear car 30.

FIGS. 20-21 show one example of how auto locking mechanism 250 may be mounted to flat bed 12 and/or track 14. Barrel 252 is securable to flat bed 12 via brackets. In the depicted embodiment, an end bracket 258 and an intermediate bracket 260 is shown secured proximate the ends of barrel 252. End bracket 258 and intermediate bracket 260 are, in turn, securable to flat bed 12 with bolts 262.

Secured in this manner, engagement arm 58 extends to or above the upper surface 15 of track 14 (see FIG. 20 for example).

Auto locking mechanism 250 may further include or be used in combination with a number of different transmission components. For example, the transmission component may simply be a flange (not shown) that extends from the frame of car 28, 30, or 31 to catch or engage with stopper 59 of engagement arm 58.

In the present embodiment, the transmission component comprises a tab 264 mounted on rear car 30, where tab 264 is adapted to engage with engagement arm 58. As depicted, tab 264 is rotatable between an engaged orientation and a disengaged orientation. In other words, tab 264 may be flipped downwards to engage engagement arm 58, and flipped upwards to disengage with engagement arm 58.

In an alternate application, auto locking mechanism 250 may instead be used in combination with tensioning and locking apparatus 90, as described above.

Auto locking mechanism 250 operates in a similar fashion as that described above with regards to auto locking mechanisms 50 and 150.

Since engagement arm 58 extends to or above the upper surface 15 of track 14 adjacent to tab 264, engagement arm 58 acts as a system stopper for engaging tab 264 and helps to prevent rear car 30 from moving forward past engagement arm 58. Since engagement arm 58 is coupled to flat bed 12 and/or track 14 via auto locking mechanism 250, the exerted force on tab 264 by engagement arm 58 causes rear car 30 to slide further backward along tracks 14, pulling tarp 20 taut. As well, the engagement of tab 264 with engagement arm 58 prevents rear car 30 from sliding forward along tracks 14, thus locking rear car 30 and tarp 20 in a closed position.

To open sliding tarpaulin system 10, the process is reversed. Retraction of piston 254 and engagement arm 58, or their forward motion, causes engagement arm 58 to move away from tab 264. When tab 264 is extending upwardly in the disengaged orientation, tab 264 cannot engage engagement arm 58. The rear car 30 is then free to slide forward of engagement arm 58.

An advantage of the present invention is its slim profile (see FIGS. 7, 13, and 21 for example), which allows the motor or mechanism to be secured between flat bed 12 and tracks 14/sliding tarpaulin system 10, and/or below flat bed 12. In this manner, they do not encroach on the loading space which also helps to prevent damage to the auto locking mechanism. Its slim profile also allows the present invention to hang just below flat bed 12 so as not to interfere with the tires. In particular, the present invention may fit within the narrow gap G between the side rail of the trailer 12 and the sliding tarp system track 14 so the system components can be mounted and utilized to transmit motion from the drive means (positioned below the trailer) to the sliding tarp system 10 frames above flat bed 12.

The use of a motor or a hydraulic pump along with the slim structure of the auto locking mechanism allows the locking and tensioning of the system to be automatically powered. This generally helps to make the tensioning and locking of sliding tarpaulin system 10 more efficient, quicker and safer.

Another potential advantage of the present disclosure is that stationary guide 40 of the auto locking mechanism and locking apparatus 90 may be secured anywhere along the length of truck bed 12, not necessarily at rear car 30, so long as they can engage with one another. As noted above, under mount 56 may be located anywhere along the side of truck bed 12 without contacting the tires.

The auto locking mechanism and housing 114 may also be positioned at one of multiple locations along the truck based on the trailer design. The present invention allows for the auto locking mechanism to be situated below the interior deck level of the trailer, which would otherwise interfere with cargo space. In that regard, the auto locking mechanism may be positioned and operate from the narrow space, or critical gap G between the trailer side rail and the sliding tarp system track. The auto locking mechanism may also, or instead, be installed to the underside of the sliding tarp system track, whereby engagement arm 58 may extend to the exterior of sliding tarp system 10 and latch onto rear car 30 frame, thus forcing the system to tension to the rear of the trailer.

It will be apparent to those having ordinary skill in the art that certain adaptations and modifications of the described embodiments can be made, consistent with and without departing from the present invention. Unless otherwise indicated, the embodiments described in the invention shall be understood to be non-exclusive of each other such that any embodiment can include different features of other embodiments. Therefore, the above discussed embodiments are considered to be illustrative and not restrictive. Other embodiments consistent with the present invention will become apparent from consideration of the specification and the practice of the present invention taught and suggested herein.

It also will be apparent to those of skill in the art that the present invention can be used with any form of sliding tarpaulin system comprising a tarpaulin affixed to a plurality of cars that slide along a track. For example, the present invention can be used with a curtain-style sliding tarpaulin system installed on a single surface of a covered trailer, in addition to systems that cover flat bed trailers such as the one described herein. Accordingly, the specification and the embodiments disclosed therein are to be considered exemplary only, with the true scope of the present invention being identified in the following claims.

The invention claimed is:

1. An auto locking mechanism for use with a flat bed and a sliding tarpaulin system, the auto locking mechanism comprising:
    a stationary guide having a longitudinal axis, the stationary guide being securable to the flat bed between the flat bed and the sliding tarpaulin system;
    a mobile component slidably coupled to the stationary guide along the longitudinal axis;
    an actuator operatively coupled to the mobile component, the actuator adapted to impart motion to the mobile component relative to the stationary guide; and
    an engagement arm secured to the mobile component for engagement with the sliding tarpaulin system,
    wherein movement imparted on the mobile component by the actuator slides the mobile component and the engagement arm relative to the stationary guide, thereby moving the sliding tarpaulin system relative to the flat bed.

2. The auto locking mechanism of claim 1, wherein the stationary guide is an elongate backboard plate and the mobile component is a rail, the auto locking mechanism further comprising:
    a threaded shaft rotatably coupled to the backboard plate; and
    a drive member having a threaded coupler operatively circumscribing the threaded shaft, and a connector arm secured between the threaded coupler and the rail;
    the actuator being a first transmission means for imparting rotational motion to the shaft relative to the backboard plate;
    wherein rotation of the threaded shaft by the first transmission means causes the shaft to rotate about its elongate axis, which in turn moves the threaded coupler of the drive member, and hence the connector arm, longitudinally along the shaft; and
    wherein movement of the connector arm slides the rail and the engagement arm relative to the backboard plate.

3. The auto locking mechanism of claim 2, wherein the first transmission means is a motor.

4. The auto locking mechanism of claim 3, wherein the rail has a cross-sectional width or diameter of 3 inches or less.

5. The auto locking mechanism of claim 4, wherein the backboard plate is securable to the flat bed such that the threaded shaft and the first transmission means hangs below the flat bed in use.

6. The auto locking mechanism of claim 5, wherein the first transmission means and the threaded shaft are positioned proximate one end of the backboard plate.

7. The auto locking mechanism of claim 6, wherein the engagement arm is secured proximate an opposite end of the backboard plate.

8. The auto locking mechanism of claim 7, wherein the rail is slidably secured to the backboard plate with brackets.

9. The auto locking mechanism of claim 8, further comprising a tensioning and locking apparatus, the tensioning and locking apparatus comprising:

an elongate rod housing for mounting on the sliding tarpaulin system, the rod housing comprising an elongate slot formed therein, a first transverse slot formed therein at one end of the elongate slot, a second transverse slot formed therein at another end of the elongate slot, the elongate slot and the first and second transverse slots in communication with each other;

a threaded rod provided in the elongate slot; and a threaded tensioning nut circumscribing the rod within the elongate slot, the tensioning nut having an arm extending therefrom through one of the elongate slot and the first and second transverse slots to an exterior of the rod housing.

10. The auto locking mechanism of claim 9, wherein the tensioning and locking apparatus is securable to the sliding tarpaulin system and the engagement arm engages with the tensioning and locking apparatus.

11. The auto locking mechanism of claim 1, wherein the stationary guide is a barrel and the mobile component is a piston, the barrel and the piston collectively forming a hydraulic cylinder.

12. The auto locking mechanism of claim 11, wherein the actuator is a hydraulic pump adapted to deliver fluid to the hydraulic cylinder to move the piston.

13. The auto locking mechanism of claim 12, wherein the hydraulic cylinder has a cross-sectional diameter of 3 inches or less.

14. The auto locking mechanism of claim 13, wherein the engagement arm is secured to the piston.

15. The auto locking mechanism of claim 14, wherein the barrel is securable to the flat bed with brackets.

16. The auto locking mechanism of claim 15, further comprising a tab for mounting on the sliding tarpaulin system, the tab adapted to engage with the engagement arm.

17. The auto locking mechanism of claim 16, wherein the tab is rotatable between an engaged orientation and a disengaged orientation.

* * * * *